(12) United States Patent
Tateno

(10) Patent No.: US 8,049,823 B2
(45) Date of Patent: Nov. 1, 2011

(54) PROJECTOR, OPTICAL COMPENSATION METHOD THEREFOR, AND LIQUID CRYSTAL DEVICE

(75) Inventor: Yoshitake Tateno, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 1026 days.

(21) Appl. No.: 11/977,090

(22) Filed: Oct. 23, 2007

(65) Prior Publication Data
US 2008/0100759 A1 May 1, 2008

(30) Foreign Application Priority Data

Oct. 27, 2006 (JP) ................................. 2006-292193
Jul. 19, 2007 (JP) ................................. 2007-188350

(51) Int. Cl.
*G02F 1/1335* (2006.01)
(52) U.S. Cl. ............................. 349/5; 349/18; 349/120
(58) Field of Classification Search .............. 349/18, 349/117–121, 5–10
See application file for complete search history.

(56) References Cited

U.S. PATENT DOCUMENTS

| 5,490,006 | A * | 2/1996 | Masumoto et al. ............ 349/117 |
| 7,403,248 | B2 | 7/2008 | Uchida et al. |
| 7,561,233 | B2 | 7/2009 | Hisatake |
| 7,570,328 | B2 | 8/2009 | Haruyama |
| 2006/0050215 | A1 * | 3/2006 | Haruyama .................... 349/117 |
| 2006/0215091 | A1 * | 9/2006 | Muramoto et al. ............ 349/117 |
| 2008/0043158 | A1 * | 2/2008 | Shirasaka et al. ................. 349/9 |
| 2008/0278668 | A1 | 11/2008 | Haruyama |

FOREIGN PATENT DOCUMENTS

| CN | 1487340 A | 4/2004 |
| JP | 2006-11298 A | 1/2006 |
| JP | 2006-011298 A | 1/2006 |
| JP | 2006-078637 A | 3/2006 |
| WO | WO-2005-078516 A | 8/2005 |
| WO | WO 2006001188 A1 * | 1/2006 |

OTHER PUBLICATIONS

K. Ohmuro, et al., Development of Super-High-Image-Quality Vertical-Alignment-Mode LCD, SID 97 Digest, 1997, pp. 845-848.

* cited by examiner

*Primary Examiner* — Mark Robinson
*Assistant Examiner* — Michael Inadomi
(74) *Attorney, Agent, or Firm* — AdvantEdge Law Group, LLC

(57) ABSTRACT

The disclosure is directed to projectors, optical compensation methods and liquid crystal devices. In one example, a liquid crystal panel has a liquid crystal layer pinched between a pair of substrates. A pair of polarizing plates is disposed with the liquid crystal panel in between the polarizing plates. A first phase difference plate is disposed between the pair of polarizing plates for compensating for a phase difference of the liquid crystal panel. A second phase difference plate is disposed between the pair of polarizing plates for compensating for a phase difference of the pair of polarizing plates. In certain embodiments, the first phase difference plate may have an optically anisotropic layer having a negative refractive index anisotropy and an optical axis oriented in a thickness direction of the first phase difference plate. This abstract is intended only to aid those searching patents, and is not intended to be used to interpret or limit the scope or meaning of the claims in any manner.

6 Claims, 9 Drawing Sheets

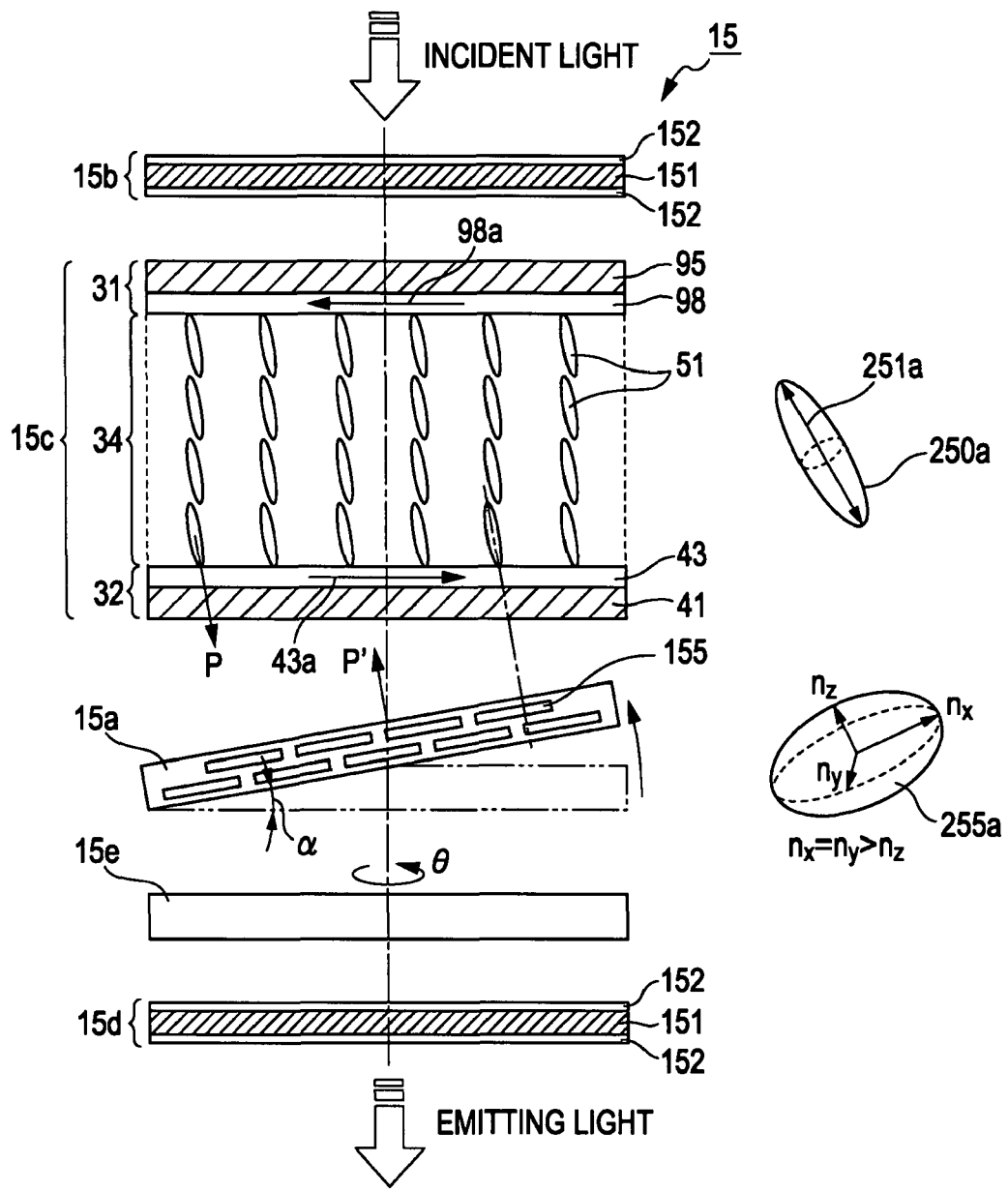

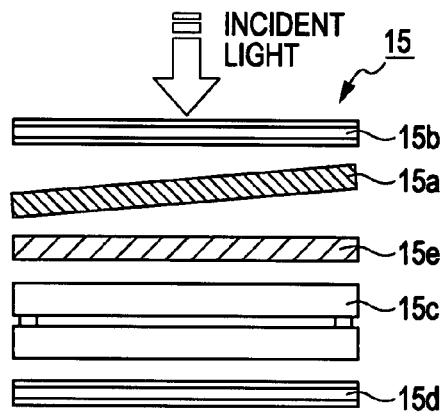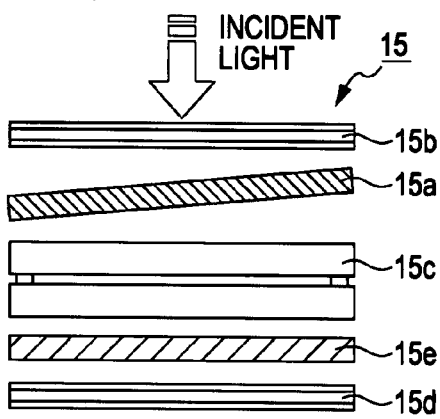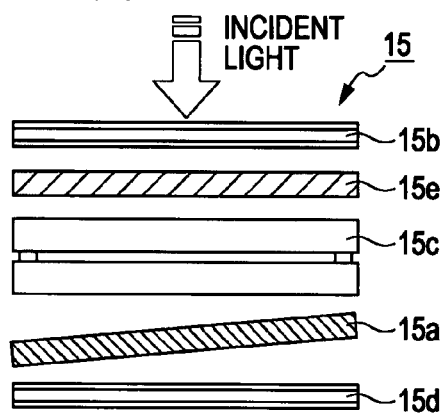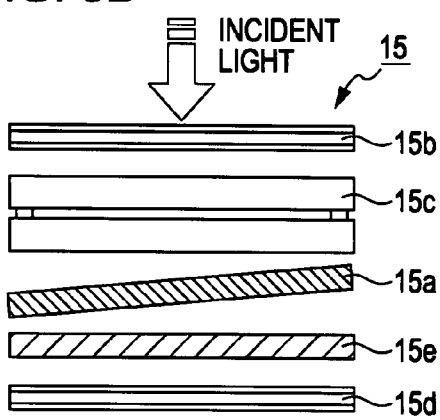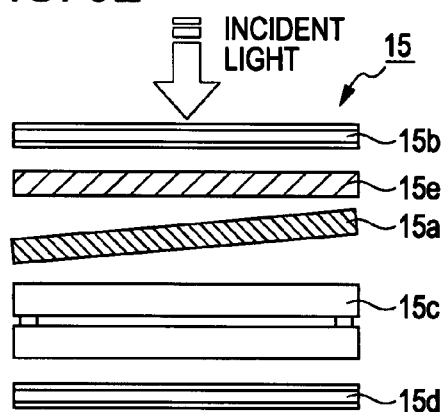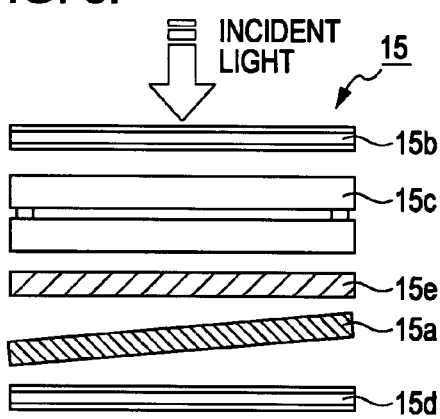

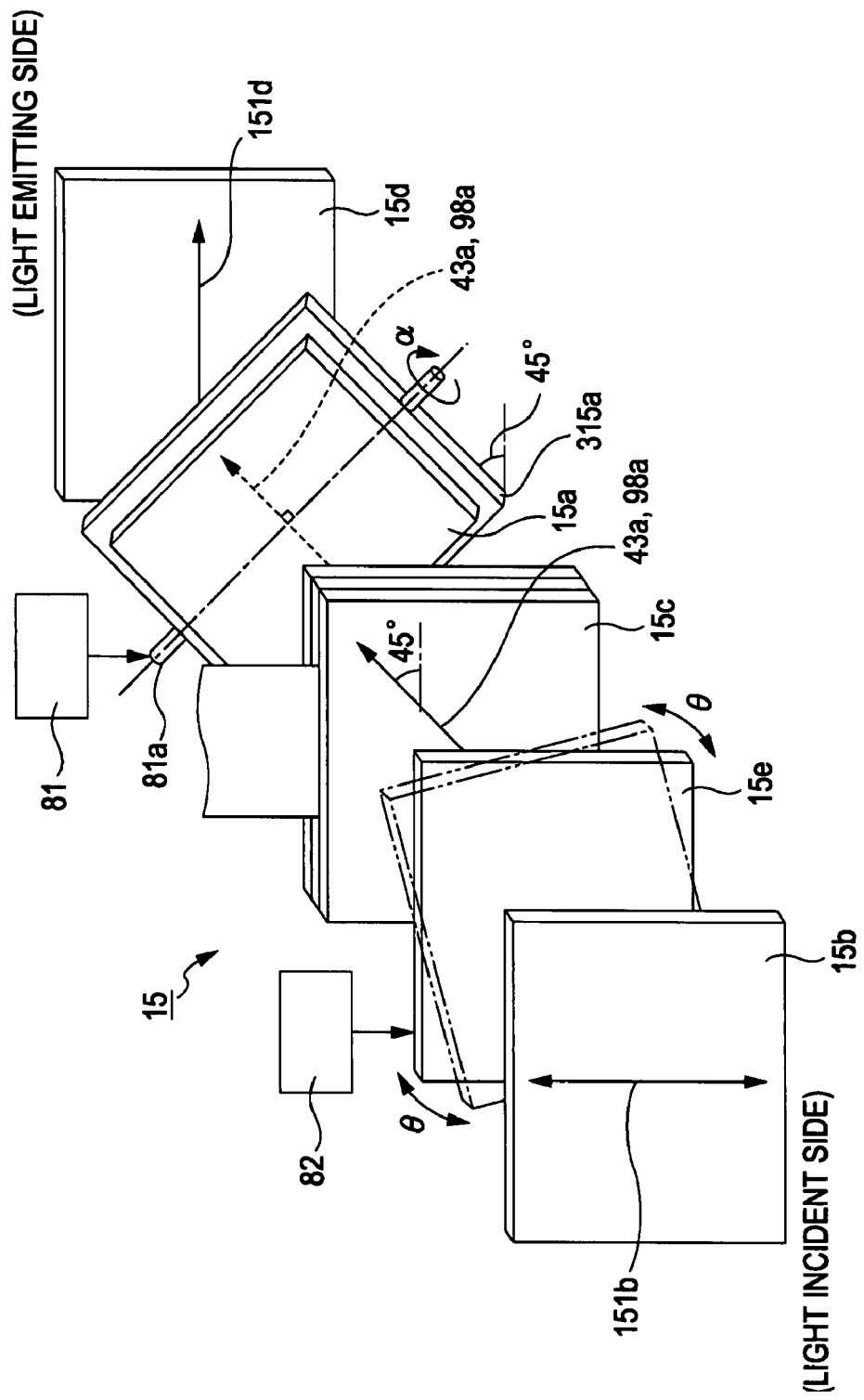

PROJECTOR, OPTICAL COMPENSATION METHOD THEREFOR, AND LIQUID CRYSTAL DEVICE

CROSS-REFERENCES TO RELATED APPLICATIONS

The present application claims priority from Japanese Patent Application No. 2006-292193 filed on Oct. 27, 2006, and Japanese Patent Application No. 2007-188350 filed on Jul. 19, 2007, the disclosures of which are hereby incorporated by reference in their entirety.

BACKGROUND

The disclosure relates to a projector, an optical compensation method therefor, and a liquid crystal device.

Recently, liquid crystal projectors (projection-type display devices) have been in practical use as display devices for large screen displays. A light valve structure has been proposed for such projectors that has a liquid crystal device driven in a VA (Vertical Alignment) mode in which liquid crystal molecules having a negative dielectric anisotropy are vertically aligned with respect to a substrate thereof and the liquid crystal molecules are aligned horizontally by application of voltage. In addition, in order to improve the contrast level of this kind of liquid crystal projector, technology in which a phase difference plate is disposed to be tilted with respect to the liquid crystal light valve has been proposed (see, for example, Japanese Patent Application Laid-Open Publication No. 2006-11298).

By using the above-described technology, the contrast level of the liquid crystal projector can be improved as compared with where the phase difference plate is not tilted. However, when the structure disclosed in Japanese Patent Application Laid-Open Publication No. 2006-11298 is used for a liquid crystal projector, it can be difficult to obtain a sufficient contrast level due, at least in part, to the combination of the polarizing plate and the refraction element.

For example, a TAC (triacetyl cellulose) film may be used as a protection film for the polarizing plate, and this protection film has a phase difference. However, it is difficult to compensate for this using the phase difference plate.

Furthermore, when a refraction element such as a micro lens array is provided in the liquid crystal projector, a phase difference of light is generated depending on a position in which the light passes through a micro lens, and diffusion of the light further occurs. In such a case, even when a tilt angle is set to a pre-tilt of the liquid crystal, light that cannot be compensated for is included, and accordingly, the contrast level of the liquid crystal projector decreases.

SUMMARY

In certain embodiments, a projector includes a light source and a liquid crystal light valve that modulates light emitted from the light source. The liquid crystal light valve includes a liquid crystal panel having a liquid crystal layer pinched between a pair of substrates, a pair of polarizing plates disposed with the liquid crystal panel therebetween, a first phase difference plate that is disposed between the pair of polarizing plates for compensating at least for a phase difference of the liquid crystal panel, and a second phase difference plate that is disposed between the pair of polarizing plates for compensating at least for a phase difference of the pair of polarizing plates.

In accordance with these embodiments, the phase difference of the polarizing plates that are not compensated with first phase difference plate may be compensated by the second phase difference plate. Accordingly, it is possible to configure a projector capable of displaying with higher contrast.

Furthermore, since luminance non-uniformity due to a phase difference of the polarizing plate can be reduced by the second phase difference plate, a projector capable of higher-quality display with luminance uniformity and high contrast can be achieved.

In certain embodiments, the second phase difference plate is configured to compensate for a phase difference due to an optical element having a diffraction functionality which is included in the liquid crystal light valve. This configuration is effective when the phase difference due to the diffraction cannot be compensated by the first phase difference plate. In addition, the luminance non-uniformity generated by the optical element can be reduced.

According to other embodiments, a projector may include a light source, a liquid crystal light valve that modulates light emitted from the light source, a first optical control unit for tilting a first phase difference plate with respect to a panel face of a liquid crystal panel, and a second optical control unit for rotating a second phase difference plate around an axis aligned in a direction of a normal line of the panel face of the liquid crystal panel. The liquid crystal light valve may include a liquid crystal panel sandwiching a liquid crystal layer between a pair of substrates, a pair of polarizing plates disposed with the liquid crystal panel therebetween, and the first and second phase difference plates disposed between the pair of polarizing plates.

In accordance with certain embodiments in which the control unit for tilting the first phase difference plate and the control unit for rotating the second phase difference plate are provided, it is possible to help prevent a decrease in the contrast level due to a pre-tilt of the liquid crystal by tilting the first phase difference plate. Furthermore, it is possible to help compensate for the phase difference of the polarizing plates in a relatively easy manner, which cannot be completely compensated by the first phase difference plate, by rotating the second phase difference plate. Thus, the phase difference that cannot be individually compensated for by the first phase difference plate can be compensated for with the second phase difference plate. Accordingly, it is possible to implement a projector capable of a higher-quality display with a higher contrast level and less luminance non-uniformity.

In addition, a phase difference of the first phase difference plate can be compensated for by rotating the second phase difference plate. For example, the phase difference of the first phase difference plate which can be generated due to certain manufacturing errors (or deviances) generated by, for example, the manicuring process, may be compensated by rotating the second phase difference plate.

In certain embodiments, the first optical control unit rotates the first phase difference plate around an axis that is perpendicular to a viewing direction of the liquid crystal panel on a plate face of the first phase difference plate.

In such cases, an optical axis of the first phase difference plate can be disposed with respect to the liquid crystal panel while maintaining a moving face of the optical axis of the first phase difference plate to be parallel to an orientation direction of the plate direction. Accordingly, it is possible to implement a projector having an optical control unit that can relatively easily perform optimized disposition of the first phase difference plate in a short time.

In certain embodiments, the first phase difference plate has an optically anisotropic layer having a negative refractive index anisotropy and an optical axis oriented in a thickness direction of the first phase difference plate, and the second phase difference plate has an optically anisotropic layer having either a positive or negative refractive index anisotropy and an optical axis oriented in a face direction of the second phase difference plate.

By using the above-described phase difference plates as the first and second phase difference plates, optical compensation of the liquid crystal panel and optical compensation of the polarizing plate can be effectively performed, and thereby a higher-quality display with higher contrast and less luminance non-uniformity can be acquired.

In certain embodiments, the optical axis of the first phase difference plate in the thickness direction and the viewing direction of the liquid crystal panel are substantial similar or even approximately identical to each other.

Accordingly, the phase difference, depending on the viewing angle of the liquid crystal panel, can be sufficiently compensated and a higher-contrast display acquired.

According to other embodiments, an optical compensation method is provided for a projector having a light source and a liquid crystal light valve modulating light emitted from the light source. The liquid crystal light valve has a liquid crystal panel formed by pinching a liquid crystal layer between a pair of substrates, a pair of polarizing plates disposed with the liquid crystal panel therebetween, and first and second phase difference plates disposed between the pair of polarizing plates. The optical compensation method may include tilting the first phase difference plate with respect to a panel face of the liquid crystal panel, and rotating the second phase difference plate around an axis aligned in a normal line of the panel side of the liquid crystal panel.

By using the optical compensation method including the optical control process of tilting the first phase difference plate and the optical control process of rotating the second phase difference plate, a decrease in the contrast level due to the pre-tilt of the liquid crystal can be prevented by tilting the first phase difference plate. Furthermore, it is possible to relatively easily compensate for the phase difference of the polarizing plate or the like, which cannot be completely compensated for by the first phase difference plate, by rotating the second phase difference plate.

In addition, a phase difference of the first phase difference plate can be compensated by rotating the second phase difference plate. For example, the phase difference of the first phase difference plate which can be generated due to a manufacturing error generated in a manufacturing process thereof may be compensated by rotating the second phase difference plate.

Accordingly, a phase difference, which may not be individually compensated for by the first phase difference plate may be compensated for by the second phase difference plate. As a result, higher-quality displays with higher contrast and less luminance non-uniformity can be acquired.

In certain embodiments, the tilting of the first phase difference plate compensates for at least the phase difference of the liquid crystal panel and the rotating of the second phase difference plate compensates for at least a phase difference of the pair of polarizing plates.

Since the phase difference of the polarizing plates is not sufficiently compensated for by only the first phase difference plate, compensating for the phase difference of the liquid crystal panel that depends on the viewing angle of the liquid crystal panel may be compensated by the second phase difference plate. Accordingly, it is possible to acquire a higher-contrast display. Furthermore, since luminance non-uniformity due to a phase difference of the polarizing plate can be reduced by compensating the phase difference of the polarizing plate using the second phase difference plate, a higher-quality display with luminance uniformity and higher contrast can be acquired.

An optical element that can serve to diffract incident light may be provided in the liquid crystal panel. In accordance with certain embodiments, the rotating of the second phase difference plate may compensate for a phase difference due to the diffraction of the optical element. As such, a display with higher contrast can be achieved.

In certain embodiments, the rotating of the first optical control unit involves rotating the first phase difference plate around an axis that is perpendicular to the viewing direction of the liquid crystal panel on a panel face of the first phase difference plate.

In accordance with these embodiments, an optical axis of the first phase difference plate can be disposed with respect to the liquid crystal panel while maintaining a moving face of the optical axis of the first phase difference plate to be parallel to an orientation direction of the plate direction. Accordingly, it is possible to relatively easily optimize a disposition process of the first phase difference plate in a relatively short period of time.

In certain embodiments, the first phase difference plate may have an optically anisotropic layer having a negative refractive index anisotropy and an optical axis oriented in a thickness direction of the first phase difference plate. The rotating of the first optical control unit may involve having the optical axis oriented in the thickness direction and the viewing direction of the liquid crystal panel be substantially similar or even approximately identical to each other.

In such manner, the optical compensation of the liquid crystal panel performed by the first phase difference plate and the optical compensation of the polarizing plate performed by the second phase difference plate may be performed, and thereby a higher-quality display with higher contrast and less luminance non-uniformity can be acquired.

According to other embodiments, a liquid crystal device includes a liquid crystal panel having a liquid crystal layer pinched between a pair of substrates, a liquid crystal panel having a liquid crystal layer pinched between a pair of substrates, a first phase difference plate that is disposed between the pair of polarizing plates compensating at least for a phase difference of the liquid crystal panel, and a second phase difference plate that is disposed between the pair of polarizing plates compensating at least for a phase difference of the pair of polarizing plates.

Since the phase difference of the polarizing plates that cannot be completely compensated for by only the first phase difference plate may be compensated by the second phase difference plate, it is possible to configure a liquid crystal device capable of a higher-contrast display. Furthermore, since luminance non-uniformity due to the phase difference of the polarizing plate can be reduced by compensating for the phase difference of the polarizing plate using the second phase difference plate, a higher-quality display with luminance uniformity and higher contrast can be acquired.

A phase difference of the first phase difference plate can be compensated by rotating the second phase difference plate. For example, the phase difference of the first phase difference plate which may be generated due to a manufacturing error generated in a manufacturing process may be compensated by rotating the second phase difference plate.

In certain embodiments, the first phase difference plate may have an optically anisotropic layer having a negative refractive index anisotropy and an optical axis oriented in a thickness direction of the first phase difference plate. The second phase difference plate may have an optically anisotropic layer having a positive or negative refractive index anisotropy and an optical axis oriented in a face direction of the second phase difference plate.

In this manner, the optical compensation of the liquid crystal panel performed by the first phase difference plate and the optical compensation of the polarizing plate performed by the second phase difference plate can be effectively performed, and thereby a liquid crystal device capable of a higher-quality display with higher contrast and less luminance non-uniformity can be acquired.

In certain embodiments, the optical axis of the first phase difference plate in the thickness direction and the viewing direction of the liquid crystal panel are substantially similar or even approximately identical to each other.

In such cases, the phase difference due to the viewing angle of the liquid crystal panel can be sufficiently compensated, thereby acquiring a higher-contrast display.

In the above-described exemplary projector, the first phase difference plate may include a first plate-shaped optical member having one surface and the other surface that faces the one surface and is tilted with respect to the one surface, and an optically anisotropic layer that is formed on the other surface, has a negative refractive index anisotropy, and has an optical axis aligned in a direction of a normal line of the other surface.

The other surface of the first plate-shaped optical member (which may be formed of glass) is formed so as to be tilted at a predetermined angle (for example, in accordance with a pre-tilt of the liquid crystal), and the optically anisotropic layer is disposed on the other surface. Typically, the first plate-shaped optical member is in the shape of a trapezoid having one surface formed without tilt and the other surface formed to be tilted. Here, "the shape of a trapezoid" according to certain embodiments indicates that a section vertically cut with respect to the one surface in a predetermined direction of the untilted one surface of the first plate-shaped optical member forms a trapezoid shape.

Thus, an angle of the first phase difference plate tilted by the first optical control unit may be set to be small or substantially zero. Since the optically anisotropic layer of the first phase difference plate is tilted with respect to the surface of the first phase difference plate, even when the angle of the first phase difference plate tilted by the first optical control unit is small, it is possible to make the optical axis of the optically anisotropic layer and the viewing direction of the liquid crystal panel identical to each other. Accordingly, it is possible to prevent a decrease in the contrast level due to the pre-tilt of the liquid crystal with scarcely tilting or without tilting the first phase difference plate using the first optical control unit.

In addition, since the angle by which the first phase difference plate is tilted with respect to the panel face of the liquid crystal panel can be set to small, radiation performance of the liquid crystal panel can be improved. In other words, the obstruction of the cooling air flow can be reduced or prevented where the cooling air flow is for cooling the liquid crystal panel disposed inside the projector due to disposition of the first phase difference plate tilted with respect to the panel face of the liquid crystal panel.

In addition, it is possible to increase the pre-tilt angle that is formed by the liquid crystal molecules and a direction of a normal line of the panel face of the liquid crystal panel. Accordingly, it is possible to improve the response time of the liquid crystal molecules or decrease a reverse-tilt domain.

In the case where the first phase difference plate has the first plate-shaped optical member and the optical anisotropic layer, the one surface and the other surface may have substantially rectangular shapes, and the other surface may be tilted in a direction that is perpendicular to one side of the one surface, viewed from a direction of a normal line of the one surface.

In such manner, the other surface of the first plate-shaped optical member can be formed to be tilted with respect to the one surface in an easy manner. Accordingly, it is possible to reduce the manufacturing cost of the projector.

In certain embodiments where the first phase difference plate has the first plate-shaped optical member and the optical anisotropic layer, the first surface and the second surface may have substantially rectangular shapes, and the second surface may be tilted in a direction that forms an acute angle with one side of the first surface, viewed from a direction of a normal line of the first surface.

In such case, the second surface of the first plate-shaped optical member is formed, for example, to be tilted at an angle of approximately 45° with respect to one side of the first surface. Thus, when the orientation of the liquid crystal panel is formed to be in a direction, for example, of an angle of 45° with one side of the liquid crystal panel, by disposing the first plate-shaped optical member and the liquid crystal panel such that one side of the first surface of the first plate-shaped optical member and one side of the liquid crystal panel are in accordance with each other, it is possible to make the optical axis of the optically anisotropic layer and the viewing direction of the liquid crystal panel substantially similar or even approximately identical to each other. In other words, the rotating of the first phase difference plate around an axis that is perpendicular to the viewing direction of the liquid crystal panel on the plate face of the first phase difference plate by using the first optical control unit may scarcely be necessary-or not necessary at all.

In the embodiments where the first phase difference plate has the first plate-shaped optical member and the optical anisotropic layer, the first phase difference plate may further include a second plate-shaped optical member disposed so as to interpose the optically anisotropic layer between the first plate-shaped optical member and the second plate-shaped optical member, and one surface of the second plate-shaped optical member facing the optically anisotropic layer may be formed to be tilted with respect to the other surface of the second plate-shaped optical member facing the one surface.

In such cases, the second plate-shaped optical member typically may have the same shape as that of the first plate-shaped optical member. As an example, the second plate-shaped optical member may have a trapezoid shape. The optically anisotropic layer is interposed between the first plate-shaped optical member and the second plate-shaped optical member. The first and second plate-shaped optical members are disposed such that directions (tilt directions of the one surfaces of the first and second plate-shaped optical members) in which thickness thereof decreases become opposite. In other words, the first and second plate-shaped optical members may be disposed such that the other surface without a tilt of the first plate-shaped optical member and the other surface without a tilt of the second plate-shaped optical member may be in accordance with each other (or approximately parallel to each other).

Accordingly, it can help prevent light emitted from the first phase difference plate from being tilted with respect to light incident on the first phase difference plate. Since refraction of light caused by the first plate-shaped optical member and refraction of light caused by the second plate-shaped optical member can be offset, the directionality of light in passing through the first phase difference plate can be improved.

In addition, since light incident on the first phase difference plate is incident on the optically anisotropic layer after passing through the first plate-shaped optical member or the second plate-shaped optical member, it is possible to help suppress deterioration of the optically anisotropic layer. In other words, the light resistance of the first phase difference plate can be improved.

In the above-described exemplary optical compensation method, the first phase difference plate may include a first plate-shaped optical member having one surface and the other surface that faces the one surface and is tilted with respect to the one surface, and an optically anisotropic layer that is formed on the other surface, has a negative refractive index anisotropy, and has an optical axis aligned in a direction of a normal line of the other surface.

In such embodiments, an angle of the first phase difference plate tilted by the first optical control unit can be set to be small or substantially zero. Accordingly, it is possible to help prevent a decrease in the contrast level due to the pre-tilt of the liquid crystal with scarcely tilting or without tilting the first phase difference plate using the first optical control unit.

In addition, since the angle by which the first phase difference plate is tilted with respect to the panel face of the liquid crystal panel can be set to be small, radiation performance of the liquid crystal panel can be improved.

In the above-described exemplary liquid crystal device, the first phase difference plate may include a first plate-shaped optical member having one surface and the other surface that faces the one surface and is tilted with respect to the one surface, and an optically anisotropic layer that is formed on the other surface, has a negative refractive index anisotropy, and has an optical axis aligned in a direction of a normal line of the other surface.

In such embodiments, an angle of the first phase difference plate tilted by the first optical control unit can be set to be small or substantially zero. Accordingly, it is possible to prevent a decrease in the contrast level due to the pre-tilt of the liquid crystal with scarcely little tilting or without tilting the first phase difference plate using the first optical control unit.

Since the angle by which the first phase difference plate is tilted with respect to the panel face of the liquid crystal panel can be set to be small, radiation performance of the liquid crystal panel can be improved.

In addition, it is possible to increase the pre-tilt angle that is formed by the liquid crystal molecules and a direction of a normal line of the panel face of the liquid crystal panel. Accordingly, it is possible to improve the response time of the liquid crystal molecules or decrease a reverse-tilt domain.

In the embodiments where the first phase difference plate has the first plate-shaped optical member and the optical anisotropic layer, the first surface and the second surface may have substantially rectangular shapes, and the second surface may be tilted in a direction that is perpendicular to one side of the first surface, viewed from a direction of a normal line of the first surface.

In such cases, the second surface of the first plate-shaped optical member can be formed to be tilted with respect to the first surface in a relatively easy manner. Accordingly, it is possible to reduce the manufacturing cost of the projector.

In the embodiments where the first phase difference plate has the first plate-shaped optical member and the optical anisotropic layer, the first surface and the second surface may have substantially rectangular shapes, and the second surface may be tilted in a direction that forms an acute angle with one side of the first surface, viewed from a direction of a normal line of the first surface.

In such cases, the second surface of the first plate-shaped optical member may be formed, for example, to be tilted by an angle of approximately 45° with respect to one side of the first surface. Thus, when the orientation of the liquid crystal panel is formed to be in a direction, for example, for forming an angle of 45° with one side of the liquid crystal panel, by disposing the first plate-shaped optical member and the liquid crystal panel such that one side of the first surface of the first plate-shaped optical member and one side of the liquid crystal panel are in accordance with each other, it is possible to make the optical axis of the optically anisotropic layer and the viewing direction of the liquid crystal panel substantially similar or even approximately identical to each other.

In the embodiments where the first phase difference plate has the first plate-shaped optical member and the optical anisotropic layer, the first phase difference plate may further include a second plate-shaped optical member disposed so as to interpose the optically anisotropic layer between the first plate-shaped optical member and the second plate-shaped optical member, and one surface of the second plate-shaped optical member facing the optically anisotropic layer may be formed to be tilted with respect to the other surface of the second plate-shaped optical member facing the one surface.

In such embodiments, light emitted from the first phase difference plate can be prevented from being tilted with respect to light incident on the first phase difference plate. Since refraction of light caused by the first plate-shaped optical member and refraction of light caused by the second plate-shaped optical member can be offset, the directionality of light in passing through the first phase difference plate can be improved.

Since light incident on the first phase difference plate is incident on the optically anisotropic layer after passing through the first plate-shaped optical member or the second plate-shaped optical member, it is possible to suppress deterioration of the optically anisotropic layer.

Additional details and exemplary embodiments are disclosed below.

BRIEF DESCRIPTION OF THE DRAWINGS

Various embodiments are described with reference to the accompanying drawings, wherein like reference numbers designate like elements.

FIG. 3 is a diagram illustrating a structure of an exemplary liquid crystal light valve.

FIGS. 6A to 6E are schematic diagrams illustrating arrangements of constituent members of an exemplary liquid crystal light valve.

FIG. 7 is a perspective view illustrating an exemplary projector.

DESCRIPTION OF EXEMPLARY EMBODIMENTS

Figure 1:
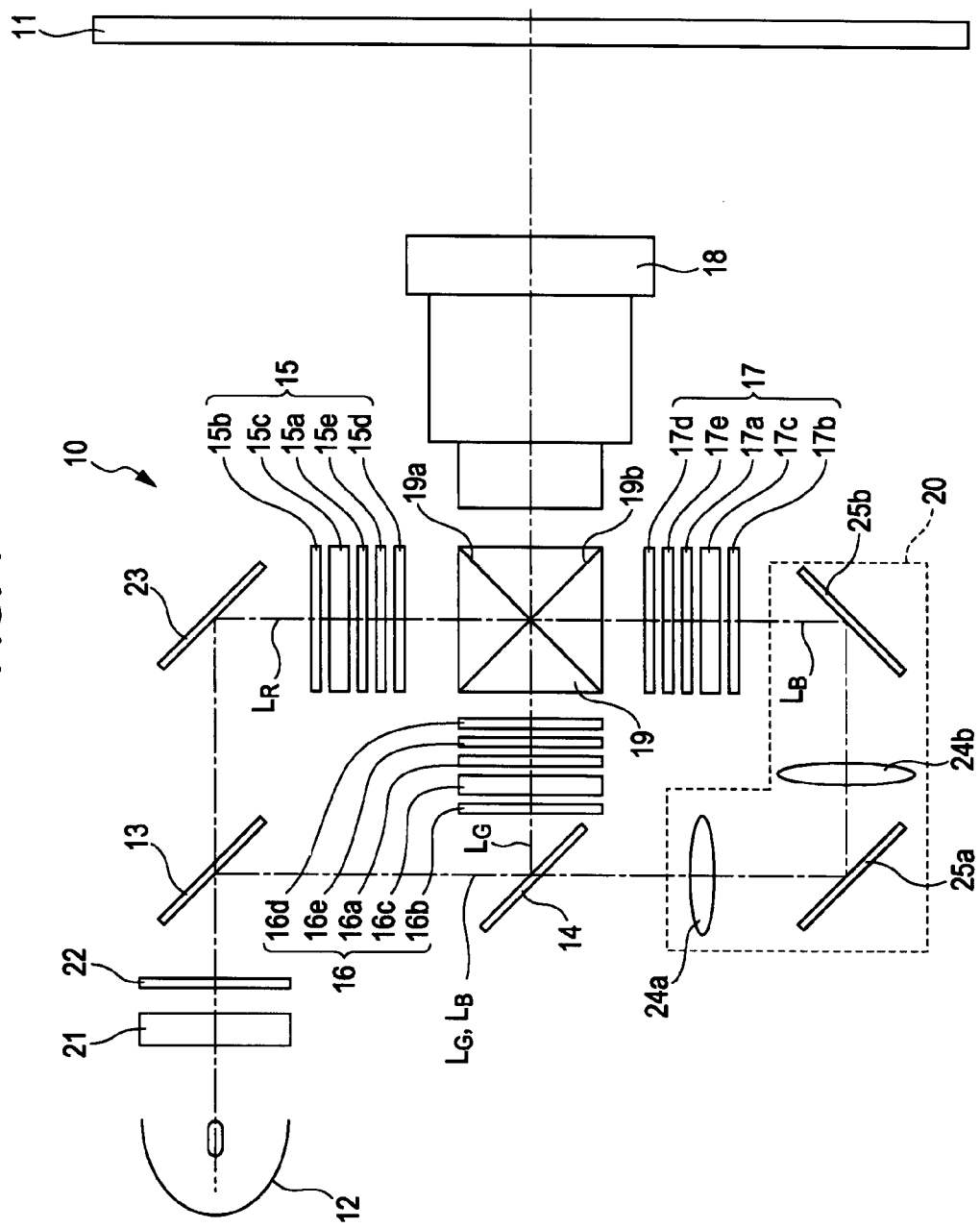
FIG. 1 is a schematic diagram illustrating a structure of an exemplary liquid crystal projector.

FIG. 1 is a schematic diagram showing a structure of a liquid crystal projector according to certain embodiments. The projector 10 is a front projection type projector that projects an image on a screen 11 provided on a front side. The projector 10 has a light source 12, dichroic mirrors 13 and 14, liquid crystal light valves 15 to 17, a projection optical system 18, a cross dichroic prism 19, and a relay system 20.

The light source 12 is constituted by an ultra high-pressure mercury lamp that supplies light of a red color, a green color, and a blue color. The dichroic mirror 13 is configured so as to transmit red light LR emitted from the light source 12 and reflects green light LG and blue light LB. From among the green light LG and the blue light LB that have been reflected by the dichroic mirror 13, the dichroic mirror 14 transmits the blue light LB and reflects the green light LG. As described above, the dichroic mirrors 13 and 14 constitute a color separating optical system that separates the red light LR, the green light LG, and the blue light LB from the light emitted from the light source 12. Between the dichroic mirror 13 and the light source 12, an integrator 21 and a polarized light converting element 22 are disposed in a mentioned order from a light source 12 side. The integrator 21 makes luminance distribution of the light emitted from the light source 12 uniform. The polarized light converting element 22 converts the light emitted from the light source 12 into a polarized light having a predetermined oscillation direction such as s polarized light.

The liquid crystal light valve 15 is a projection type liquid crystal device (electro-optical device) that modulates the red light LR transmitted through the dichroic mirror 13 and reflected by a reflection mirror 23 on the basis of an image signal. The liquid crystal light valve 15 has a first polarizing plate 15b, a liquid crystal panel 15c, a first phase difference plate 15a, a second phase difference plate 15e, and a second polarizing plate 15d.

The red light LR that has been incident on the liquid crystal light valve 15 is transmitted through the first polarizing plate 15b so as to be converted into, for example, s polarized light. The liquid crystal panel 15c converts the incident s polarized light into p polarized light (for an intermediate gray scale level, circularly polarized light or elliptically polarized light) by a modulation process on the basis of the image signal. The second polarizing plate 15d transmits the p polarized light by blocking the s polarized light. Thus, the liquid crystal light valve 15 is configured so as to modulate the red light LR on the basis of the image signal and emit the modulated red light LR toward the cross dichroic prism 19.

The liquid crystal light valve 16 is a projection type liquid crystal device for modulating the green light LG, which has been reflected by the dichroic mirror 13 and then reflected by the dichroic mirror 14, on the basis of an image signal and emitting the modulated green light LG toward the cross dichroic prism 19. Like the liquid crystal valve 15, the liquid crystal light valve 16 has a first polarizing plate 16b, a liquid crystal panel 16c, a first phase difference plate 16a, a second phase difference plate 16e, and a second polarizing plate 16d.

The liquid crystal light valve 17 is a projection type liquid crystal device for modulating the blue light LB, which has been reflected by the dichroic mirror 13, has passed through the dichroic mirror 14, and then passing through the relay system 20, on the basis of an image signal and emitting the modulated blue light LB toward the cross dichroic prism 19. Like the liquid crystal valves 15 and 16, the liquid crystal light valve 17 has a first polarizing plate 17b, a liquid crystal panel 17c, a first phase difference plate 17a, a second phase difference plate 17e, and a second polarizing plate 17d.

The relay system 20 has relay lenses 24a and 24b and reflection mirrors 25a and 25b. The replay lenses 24a and 24b are provided so as to prevent loss of the blue light LB due to its long light path. The relay lens 24a is disposed between the dichroic mirror 14 and the reflection mirror 25a. The relay lens 24b is disposed between the reflection mirrors 25a and 25b. The reflection mirror 25a is disposed so as to reflect the blue light LB, which has been transmitted through the dichroic mirror 14 and emitted from the relay lens 24a, toward the relay lens 24b. The reflection mirror 25b is disposed so as to reflect the blue light LB, which has been emitted from the relay lens 24b, toward the liquid crystal light valve 17.

The cross dichroic prism 19 is an optical system for color composition which is formed by disposing two dichroic films 19a and 19b to be orthogonal to each other in the shape of a letter "X". The dichroic film 19a reflects the blue light LB and passes the green light LG. On the other hand, the dichroic film 19b reflects the red light LR and passes the green light LG. Thus, the cross dichroic prism 19 is configured so as to compose the red light LR, the green light LG, and the blue light LB which are modulated by the liquid crystal light valves 15 to 17 and emit the composed light toward the projection optical system 18. The projection optical system 18 has a projection lens (not shown) and is configured so as to project the light composed by the cross dichroic prism 19 onto a screen 11.

Alternatively, a configuration in which $\lambda/2$ phase difference plates are provided in the liquid crystal light valves 15 and 17 for the red color and the blue color, light incident on the cross dichroic prism 19 from the liquid crystal light valves 15 and 17 is formed to be s polarized light, a $\lambda/2$ phase difference plate is not provided in the liquid crystal light valve 16, and light incident on the cross dichroic prism 19 from the liquid crystal light valve 16 is formed to be p polarized light may be used. In such a case, it is possible to configure the optimized optical system for color composition in consideration with reflection property of the dichroic films 19a and 19b by forming light incident on the dichroic prism 19 to be different types of polarized light. Generally, since the dichroic films 19a and 19b have an excellent reflection property for the s polarized light, as described above, the red light LR and the blue light LB that are reflected by the dichroic films 19a and 19b are configured to be the s polarized light and the green light LG passing through the dichroic films 19a and 19b is configured to be the p polarized light.

Next, exemplary liquid crystal light valves (liquid crystal devices) 15 to 17 will be described.

Although the liquid crystal light valves 15 to 17 have different wavelengths of light for modulation, their basic structures are the same. Thus, hereinafter, a liquid crystal panel 15c and a liquid crystal light valve 15 having the liquid crystal panel 15c will be described as an example.

Figure 2A:
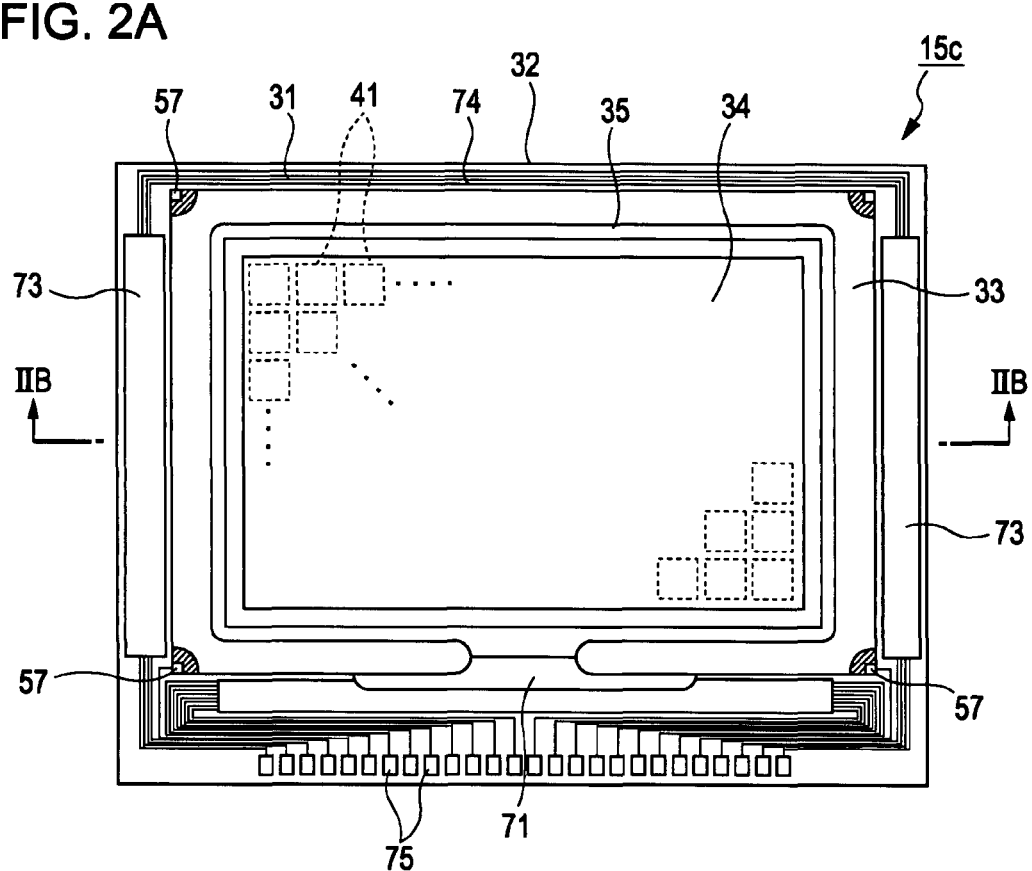
FIG. 2A is a diagram illustrating the structure of an exemplary liquid crystal panel.
Figure 2B:
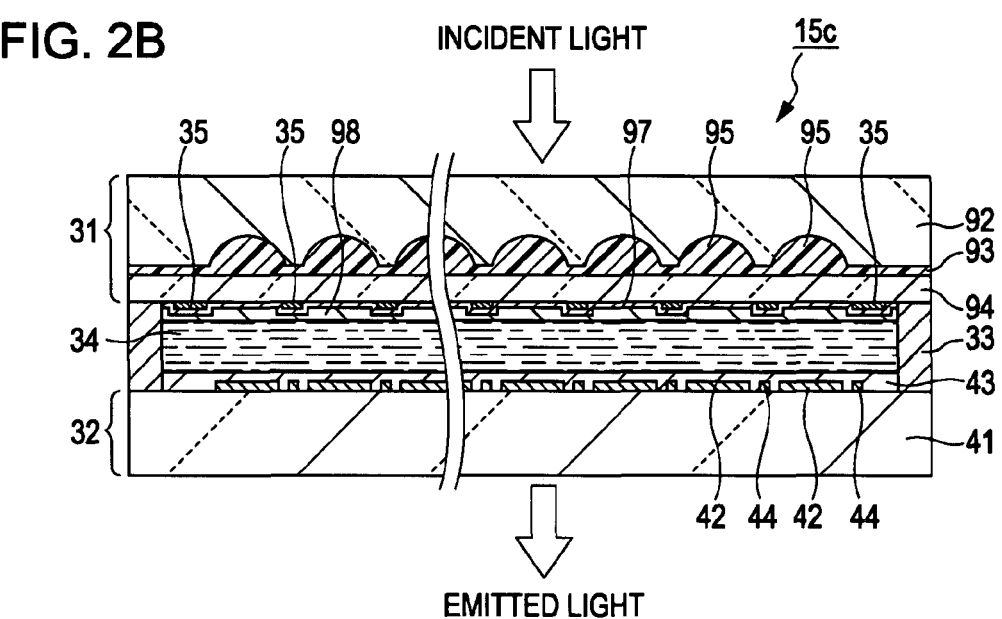
FIG. 2B is a sectional view of FIG. 2A taken along line H-H'.
Figure 4:
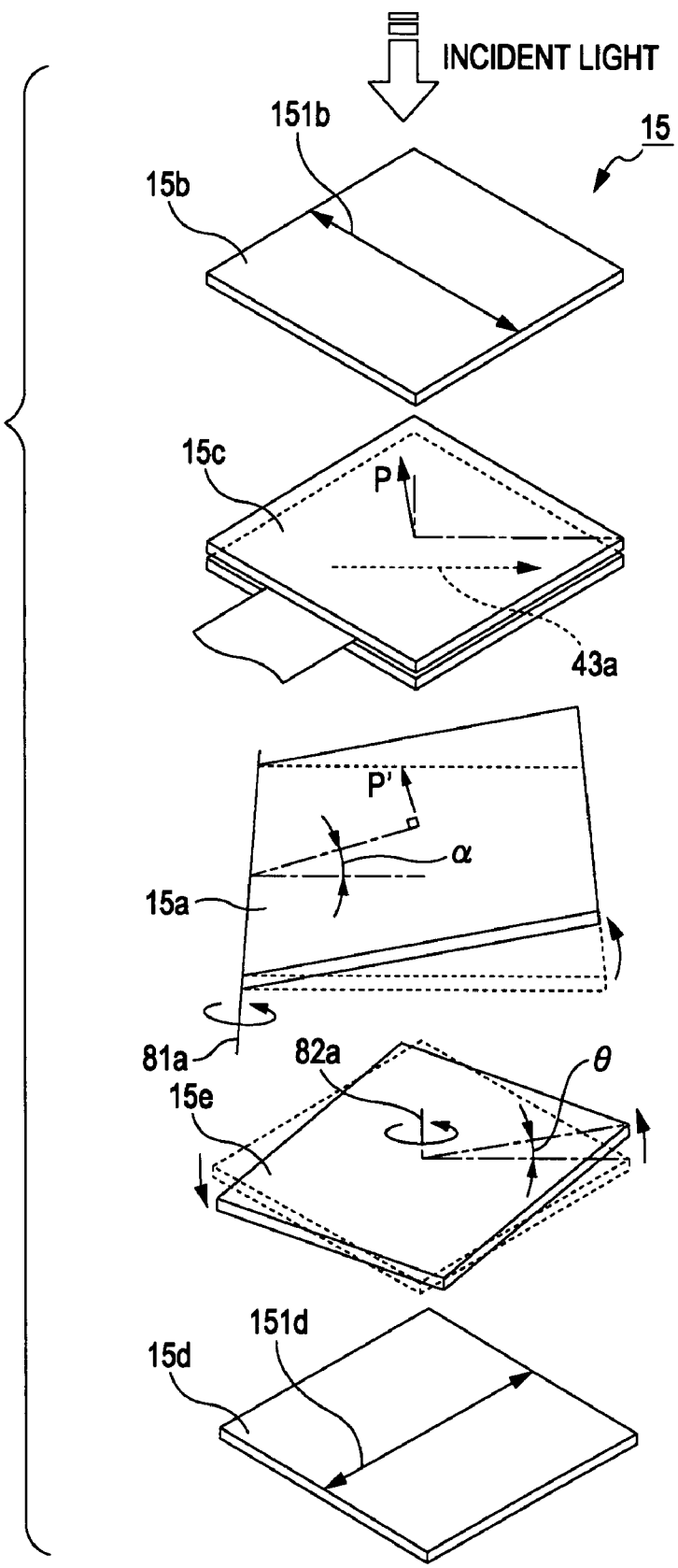
FIG. 4 is a diagram illustrating the disposition of optical axes of constituent members of an exemplary liquid crystal light valve.

FIG. 2A is a diagram showing the whole structure of the liquid crystal panel. FIG. 2B is a sectional view of FIG. 2A taken along line H-H'. FIG. 3 is a diagram showing a structure of the liquid crystal light valve. FIG. 4 is a diagram showing disposition of optical axes of constituent members shown in FIG. 3.

The liquid crystal panel 15c, as shown in FIGS. 2A and 2B, has an opposing substrate 31 and a TFT array substrate 32 which are disposed to face each other and connected to each other through a sealing member 33. A liquid crystal layer 34 is sealed in an area surrounded by the opposing substrate 31, the TFT array substrate 32, and the sealing member 33. The liquid crystal layer 34 has liquid crystals having a negative refractive index anisotropy. In the liquid crystal panel 15c according to this embodiment, as shown in FIG. 3, liquid crystal molecules 51 are interposed between the orientation films 43 and 98 so as to be in a vertical orientation with a predetermined tilt (pre-tilt angle).

The liquid crystal panel 15c has a liquid crystal layer 34 in an area defined by the TFT array substrate 32, the opposing substrate 31, and the sealing member 33. In the liquid crystal panel 15c, on an inner side of an area in which the sealing member 33 is formed, a shielding film 35 that becomes a boundary is formed. In corners of an outer periphery side of the sealing member 33, inter-substrate conduction members 57 for electrical conduction between the TFT array substrate 32 and the opposing substrate 31 are disposed.

On an outer side of the sealing member 33 forming area of the TFT array substrate 32, viewed from a front side of the liquid crystal panel, a data line driving circuit 71, external circuit mounting terminals 75, and two scanning line driving circuit 73 are formed. In addition, on the area of the TFT array substrate 32, a plurality of wires 74 used for connecting the scanning line driving circuits 73 that are provided on both sides of the image display area are formed. Instead of forming the data line driving circuit 71 and the scanning line driving circuit 73 on the TFT array substrate 32, for example, a TAB (Tape Automated Bonding) substrate in which a driving LSI is built and a terminal group formed on a peripheral portion of the TFT array substrate 32 may be connected to each other electrically and mechanically through an anisotropic conduction layer.

The opposing substrate 31, as shown in FIG. 2B, is a micro lens substrate (light collecting substrate) having a plurality of micro lenses disposed in a plane. The opposing substrate 31 is constituted by a substrate 92, a resin layer 93, and a cover glass 94 as primary components.

The substrate 92 and the cover glass 94 are transparent substrates made of glass or the like, and substrates made of silica glass, borosilicate glass, soda lime glass (blue plate glass), crown glass (white plate glass), or the like may be used as the substrate 92 and the cover glass 94. On a liquid crystal layer 34 side (bottom side of the figure) of the substrate 92, a plurality of concave portions (micro lenses) 95 are formed. The micro lens 95 collects light incident on the substrate 92 from a side opposite the liquid crystal layer 34 and emits the collected light toward the liquid crystal side 34.

The resin layer 93 is formed of a resin material filled on the micro lenses 95 of the substrate 92. The resin layer 93 is formed of a resin material through which light can pass, for example, an acrylic resin. The resin layer 93 is provided so as to cover one side of the substrate 92 and fill in insides of concaved portions of the micro lenses 95. An upper side of the resin layer 93 is formed as a flat face, and the cover glass 94 is attached to the flat face.

On a liquid crystal layer 34 side of the micro lens substrate 36, the light shielding film 35, a common electrode 97, and the orientation film 98 are formed. The light shielding film 35 has an approximate lattice shape and is formed on the cover glass 94. The micro lenses 95 are located between the light shielding films 35. The micro lenses 95 are disposed in areas overlapped with pixel areas (pixel electrode 42 forming areas) of the liquid crystal panel 15c in a plane. The orientation film 98 is a vertical orientation film that arranges liquid crystal molecules forming the liquid crystal layer 34 to be approximately vertical with respect to the substrate face. The orientation film 98, for example, is made of a silicon oxide film formed to have a columnar structure by an oblique evaporation process, a polyimide film for which an orientation process is performed, or the like.

The TFT array substrate 32 has a transparent substrate 41 made of glass, silica, or the like, pixel electrodes 42 formed on a liquid crystal layer 34 side of the substrate 41, TFTs 44 driving the pixel electrodes, and the orientation film 43 as primary components.

The pixel electrodes 42 are, for example, conduction films made of a transparent conduction material such as ITO and formed to be in the planar shape of an approximate rectangle and, as shown in FIG. 2A, are arranged in the planar shape of a matrix on the substrate 41. The pixel electrodes 42 are formed in areas overlapped with the micro lenses 95 in a plane.

Although being shown in a simplified manner, the TFTs 44 are formed on the substrate 41 in correspondence with the pixel electrodes 42. Commonly, the TFTs 44 are disposed in areas (non-display areas, light-shielding areas) that are overlapped with the light shielding film 35 on the opposing substrate 31 side.

Like the orientation film 98, the orientation film 43 formed to cover the pixel electrodes 42 is a vertical orientation film that is made of a silicon oxide film or the like formed by a oblique evaporation process.

The orientation films 43 and 98 are formed to have their orientation directions (orientation directions of columnar structures) substantially parallel to each other. The orientation films 43 and 98 serve to arrange liquid crystal molecules constituting the liquid crystal layer 34 to be almost vertical with a predetermined tilt with respect to the substrate face and arrange the tilt direction of the liquid crystal molecules to be uniform in a substrate face direction.

In addition, in an area, which is located on an inner side of the sealing member 33 forming area in a plane, on a liquid crystal layer 34 side surface of the substrate 41, data lines (not shown) and scanning lines (not shown) which connect the pixel electrodes 42 or the TFTs 44s are formed. The data lines and the scanning lines are formed in areas overlapped with the light shielding film 35 in a plane. Areas surrounded by the light shielding film 35, the TFTs 44, the data lines, and the scanning lines become pixel areas of the liquid crystal panel 15c. An image display area is formed by arranging a plurality of the pixel areas in the planar shape of a matrix.

As shown in FIG. 3, the exemplary liquid crystal light valve 15 has the above-described liquid crystal panel 15c, a first polarizing plate 15b disposed on an outer side of the opposing substrate 31 of the liquid crystal panel 15c, first and second phase difference plates 15a and 15e which are disposed on an outer side of the TFT array substrate 32, and a second polarizing plate 15d disposed on an outer side of the second phase difference plate 15e.

In the liquid crystal light valve 15 according to this embodiment, a side (upper side in the figure) in which the first polarizing plate 15b is disposed is a light incident side, and a side in which the second polarizing plate 15d is disposed is a light emitting side.

The orientation films 43 and 98 of the liquid crystal panel 15c that pinch the liquid crystal layer 34 and face each other are formed, for example, by evaporating silicon oxide in a direction tilted by about 50° with respect to a direction of a normal line of the substrate. The thickness of the orientation film 43 or 98 is about 40 nm. Orientation directions 43a and 98a denoted by arrows attached to the orientation films 43 and 98 shown in FIG. 3 are identical to a direction inside the substrate face of directions of evaporation for formation of the films. The orientation direction 43a of the orientation film 43 and the orientation direction 98a of the orientation film 98 are parallel to each other.

Depending on a restraining force of the orientation films 43 and 98, the liquid crystal molecules 51 are oriented to be tilted by 2° to 8° with respect to a normal line of the substrate and a director direction (pre-tilt direction P) of the liquid crystal molecules 51 changes from the substrate face direction to a direction along the orientation directions 43a and 98a.

The first polarizing plate 15b and the second polarizing plate 15d respectively have a three-layer structure in which a polarizing element 151 made of colored PVA (polyvinyl alcohol) is interposed between two protection layers 152 made of TAC (triacetyl cellulose). As shown in FIG. 4, a transmission axis 151b of the first polarizing plate 15b and a transmission axis 151d of the second polarizing plate 15d are disposed to be orthogonal to each other. Directions of the transmission axes 151b and 151d of the polarizing plates 15b and 15d are deviated by about 45° from the orientation direction (evaporation direction) 43a of the orientation film 43 of the liquid crystal panel 15c in a plane.

The first phase difference plate 15a includes an optically anisotropic layer having a negative refractive index anisotropy and has an optical axis aligned in a thickness direction of the first phase difference plate. In particular, a negative C plate may be used as the first phase difference plate 15a, and although the C plate using a discotic liquid crystal is used in this embodiment, a non-stretched cellulose ester film (for example, a non-stretched triacetyl cellulose (TAC) film, a non-stretched cellulose acetate propionate (CAP) film, or the like), an optical film using a biaxially-stretched norbornene resin or the like may be used.

Next to the first phase difference plate 15a in FIG. 3, an average index ellipsoid 255a of the first phase difference plate 15a is schematically shown. In the figure, nx and ny denote principal refractive indexes for face directions of the first phase difference plate 15a, and nz denotes a principal refractive index for a thickness direction of the first phase difference plate 15a. In this embodiment, a structure in which the principal refractive indexes nx, ny, and nz satisfy a relationship of nx=ny>nz is used. In other words, an index of refraction nz for the thickness direction is smaller than those for the other directions, which makes the index ellipsoid to be in the shape of a disk. The index ellipsoid is oriented to be parallel to a plate face of the first phase difference plate 15a, and a direction of an optical axis of first phase difference plate 15a (a direction of a short axis of the index ellipsoid) is parallel to a normal line of the plate face.

The second phase difference plate 15e includes an optically anisotropic layer having anisotropy of a positive or negative refractive index and has an optical axis aligned in a face direction of the second phase difference plate. In particular, an A plate or a biaxial plate may be used as the second phase difference plate 15e. The A plate is an optical film in which principal refractive indexes nx, ny, and nz satisfy relationship of nx>ny=nz. The A plate may be formed of a liquid crystal composition having a rod shape, a uniaxially-stretched polymer (for example, polycarbonate or the like), or the like.

The biaxial plate is an optical film in which the principal refractive indexes nx, ny, and nz satisfy relationship of nx>ny>nz. The biaxial plate may be formed of stretched cellulose acetate ester (for example, stretched cellulose acetate propionate (stretched CAP), triacetyl cellulose (TAC), or the like) or the like.

In the above described liquid crystal light valve 15, the liquid crystal layer 34 sealed in the liquid crystal panel 15c shows an optically positive uniaxial property, and a refractive index of the liquid crystal molecules 51 for its director direction is configured to be greater than those for other directions. In other words, the liquid crystal layer 34 is formed to have an index ellipsoid in the shape of a rugby ball, as the average index ellipsoid 250a shown in FIG. 3. Since the liquid crystal molecules 51 of the liquid crystal layer 34 are oriented to be tilted in the pre-tilt direction P, a remaining phase difference is generated at a time when black is displayed. In addition, since elliptical shapes of the liquid crystal molecules 51 vary as the liquid crystal molecules 51 are observed from a tilt side, a phase difference depending on a viewing angle is generated. This phase difference causes light leakage, whereby a contrast ratio of the liquid crystal panel decreases.

However, the discotic liquid crystal 155 constituting the first phase difference plate 15a optically shows a negative uniaxial property, and when an optical axis of the disk-shaped index ellipsoid 255a for the z direction in the first phase difference plate 15a is disposed to be parallel to an optical axis 251a of the rugby ball-shaped index ellipsoid 250a, optical properties thereof become opposite to each other, whereby a birefringence effect of the liquid crystal panel 15c can be eliminated.

Thus, in this embodiment, the first phase difference plate 15a is disposed to be tilted at an angle α from a position parallel to the substrate side of the liquid crystal panel 15c, so that the optical axis P' of the first phase difference plate 15a is approximately parallel to the pre-tilt direction of the liquid crystal of the liquid crystal panel 15c. Accordingly, it is possible to compensate for the phase difference generated by the liquid crystal panel 15c three dimensionally.

A rotation axis for tilting the first phase difference plate 15a is an axis expanding in a direction perpendicular with respect to the orientation direction 43a (98a) of the liquid crystal panel 15c in the substrate face direction. By tilting the first phase difference plate 15a around this axis, the tilt of the optical axis P' of the first phase difference plate 15a can be controlled to be in a direction identical to the pre-tilt direction P while the orientation direction 43a of the liquid crystal panel 15c and the optical axis P' of the first phase difference plate 15a are maintained to be parallel to each other in the substrate face direction, and accordingly, it is possible to acquire optimized display in an easy manner.

In addition the liquid crystal light valve 15 according to this embodiment has the second phase difference plate 15e. As described above, although the first phase difference plate 15a can be used for compensating for a phase difference due to an orientation status of the liquid crystal of the liquid crystal panel 15c, phase differences due to the first and second polarizing plates 15b and 15d or the micro lenses 95 provided in the liquid crystal panel 15c cannot be compensated by the first phase difference plate 15a. Thus, in this embodiment, the second phase difference plate 15e having its optical axis aligned in the plate face direction is provided together with an optically anisotropic layer having anisotropy of a positive or negative refractive index, and rotation around a rotation axis aligned in a direction of a normal line to the plate face can be made, as shown in FIG. 4, and thereby it is possible to compensate for the phase difference due to the first and second polarizing plates 15b and 15d and the phase difference due to diffraction of the micro lenses 95.

An optical control process of the liquid crystal light valve 15 for a projector according to this embodiment can be performed by a first optical control step in which a tilt angle of the first phase difference plate 15a provided to be tilted with respect to the substrate face of the liquid crystal panel 15c is controlled and a second optical control step in which a rotation angle of the second phase difference plate 15e provided to be rotatable around a rotation axis aligned in a direction of a normal line of the substrate of the liquid crystal panel 15c as is controlled.

In the first optical control step, a rotation axis 81a of the first phase difference plate 15a disposed to face the liquid crystal panel 15c, as shown in FIG. 4, is set on the plate face of the first phase difference plate 15a in a direction perpendicular to the orientation direction 43a (98a) of the liquid crystal panel 15c. Then, the tilt angle a is controlled by rotating the first phase difference plate 15a around the rotation axis 81a, and thereby the optical axis P' of the first phase difference plate 15a and the pre-tilt direction P of the liquid crystal layer 34 are adjusted to be substantially similar or even approximately identical to each other. Accordingly, the first phase difference plate 15a can be disposed in a position in which a phase difference of the liquid crystal layer 34 constituted by liquid crystal molecules 51 oriented to be approximately vertical so as to have the predetermined tilt angle with respect to the substrate face can be compensated three dimensionally.

In the second optical control step, a rotation axis 82a of the second phase difference plate 15e disposed to face the liquid crystal panel 15c, as shown in FIG. 4, is set in a direction of a normal line of the second phase difference plate 15e (and the liquid crystal panel 15c). Then, the second phase difference plate 15e is disposed in a position in which the phase difference due to the first and second polarizing plates 15b and 15d and the phase difference due to diffraction of the micro lenses 95, which cannot be compensated by the first phase difference plate 15a, can be compensated by rotating the second phase difference plate 15e around the rotation axis 82a so as to control the rotation angle θ. As described above, since the second phase difference plate 15e has one to two optical axes in a face direction, the positional relationship between the optical axis of the second phase difference plate 15e and the optical axes of the polarizing plates 15b and 15d or the optical axis of the liquid crystal panel 15c is changed by changing the rotation angle θ, and thereby it is possible to optimize the position of the second phase difference plate 15e.

The process for optical control of the second phase difference plate 15e may be performed while a contrast level (or luminance level of black display) is measured. Generally, an optical axis of the protection film 152 of the polarizing plate aligned in a face direction is not set in a constant direction. Furthermore, an optical axis of a polarizing plate may be deviated. Thus, the rotation angle θ of the second phase difference plate 15e cannot be set to a constant angle, and accordingly, the optimal position of the second phase difference plate 15e is determined on the basis of a position in which a maximum contrast level can be acquired or a position in which a black level becomes the minimum.

Although the first and second optical control steps may be performed in a random order, the first optical control step is performed for matching optical axes of the liquid crystal panel 15c and the first phase difference plate 15a, and the second optical control step is performed for compensating for a phase difference that cannot be compensated by using the first phase difference plate 15a, and accordingly, the first optical control step may be performed first for optimization of the first phase difference plate 15a and thereafter the phase difference due to the first and second polarizing plates 15b and 15d or the phase difference due to diffraction of the micro lenses 95 may be compensated by performing the second optical control step. By performing the optical control steps in this order, it is possible to efficiently perform an optical compensation process of a projector in a relatively short period of time.

Hereinafter, an operation according to certain embodiments will be described in more detail with reference to FIG. 5.

Figure 5:
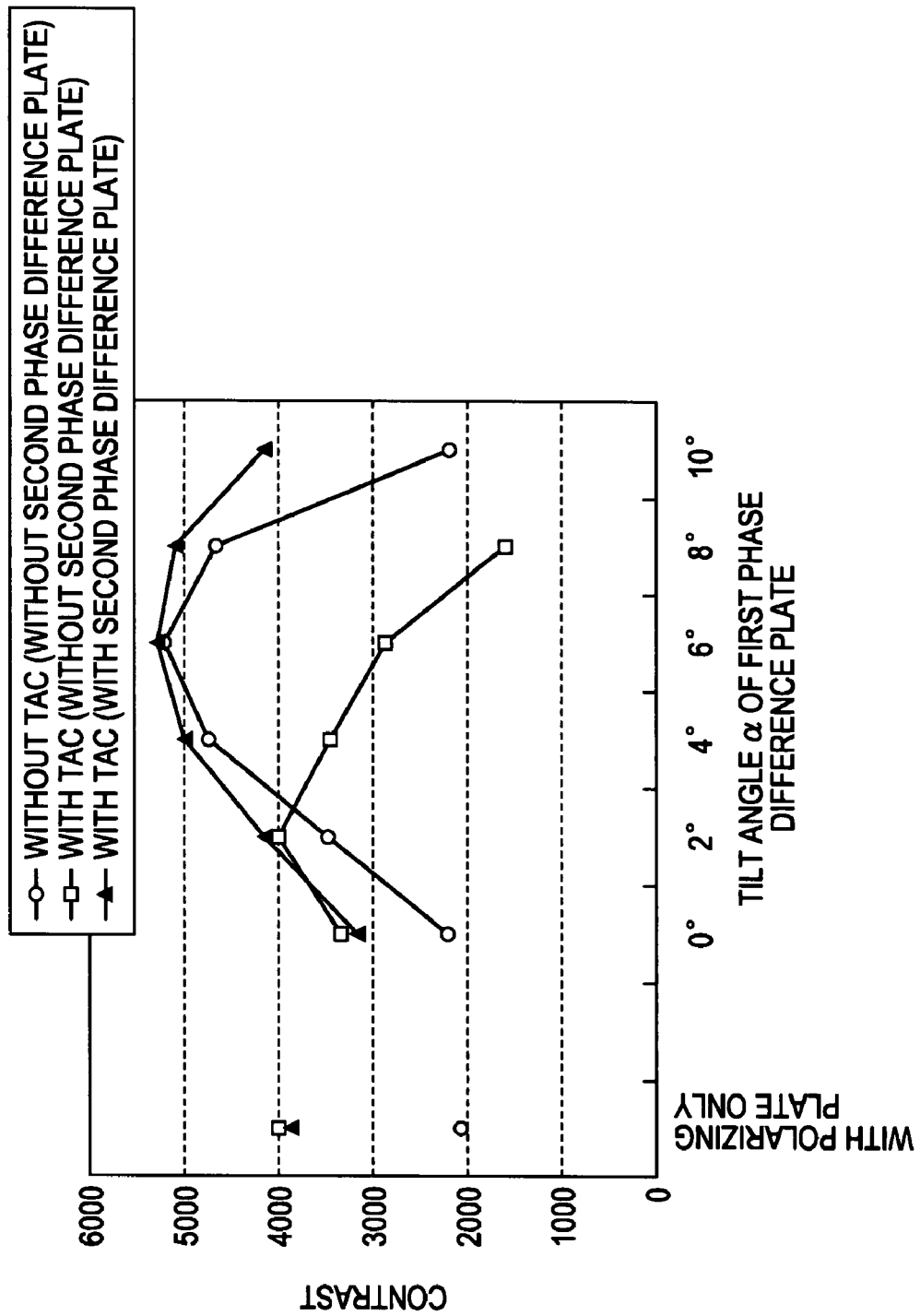
FIG. 5 is a graph for illustrating the operation of an exemplary embodiment.

FIG. 5 is a graph for describing an operation according to the embodiment. The graph shown in FIG. 5 represents contrast change of the liquid crystal light valve 15 with respect to the tilt angle α of the first phase difference plate 15a in cases with/without the phase difference of the polarizing plates 15b and 15d and the second phase difference plate 15e.

First, in a case where only the polarizing element 151 from which the protection film 152 is detached is used as the first and second polarizing plates 15b and 15d (a graph of "WITHOUT TAC"), when the first phase difference plate 15a is provided (α=0°) to the structure having only the polarizing plates, the contrast level increases slightly, but the contrast level can be improved much by controlling the tilt angle α of the first phase difference plate 15a. When the tilt angle is controlled to be α=6°, the maximum contrast level can be acquired.

Next, in a case where the first and second polarizing plates 15b and 15d having the protection layers 152 are used an a structure in which the second phase difference plate 15e is not provided (a graph of "WITH TAC (WITHOUT SECOND PHASE DIFFERENCE PLATE)") is used, when the first phase difference plate 15a is provided (α=0°) to the structure having only the polarizing plates, the contrast level decreases, and even by controlling the tile angle α of the first phase difference plate 15a, only the contrast level equivalent to that of the structure having only the phase difference plates can be acquired. As described above, when an ordinary polarizing plates having the protection layers 152 are used, a sufficient contrast level cannot be acquired even when the first phase plate 15a is disposed to be able to be tilted.

On the other hand, when the first and second polarizing plates 15b and 15d having the protection layers 152 are used and the second phase difference plate 15e is provided (a graph "WITH TAC (WITH SECOND PHASE DIFFERENCE PLATE)"), the contrast level decreases by only providing the first phase difference plate 15a (α=0°), but the contrast level is improved much by controlling the tilt angle α of the first phase difference plate 15a. In such a case, the contrast level increases markedly, compared to a case where the same polarizing plates are used and the second phase difference plate 15e is not provided (a graph "WITH TAC (WITHOUT PHASE DIFFERENCE PLATE)").

As described above, in the projector according to this embodiment, the phase difference due to the protection layers 152 of the first and second polarizing plates 15b and 15d and diffraction of-the micro lenses 95 can be effectively compensated by the second phase difference plate 15e, and accordingly, it is possible to acquire high-contrast display. Furthermore, an optical axis may be deviated within a face of the protection layer 152 of the polarizing plate, and thus non-uniform luminance may be generated within the image display area due to the protection layer 152, but in this embodiment, by using the second phase difference plate 15e, the non-uniform luminance can be suppressed together with improving the contrast level, and accordingly, it is possible to acquire high quality display.

In addition, in a graph "WITH TAC (WITHOUT SECOND PHASE DIFFERENCE PLATE)", a high contrast level is acquired by using a structure having only the polarizing plates, compared to a case where only the polarizing elements is used without any protection layer. However, the reason for the acquisition of the high contrast level is attributed to that the protection layer 152 having a phase difference serves as an optical compensation plate incidentally. However, in a general polarizing plate, since the optical axis of the protection layer 152 varies, there is a high possibility that, on the contrary, that the contrast level decreases much when the polarizing plate is changed. However, in this embodiment, since the phase difference of the protection layer 152 is compensated by the second phase difference plate 15*e*, even when the polarizing plate is changed, it is possible to acquire an optimized display by only controlling the position of the second phase difference plate 15*e*.

In the above-described embodiment, although a structure in which the first and second phase difference plates 15*a* and 15*e* are disposed in a light emitting side of the liquid crystal panel 15*c* is described as the structure of the liquid crystal light valve 15*c*, the disposition of the liquid crystal panel 15*c* and the first and second phase difference plates 15*a* and 15*e* in the liquid crystal light valve 15 is not limited thereto, and other various disposition forms may be used.

FIGS. 6A to 6F are schematic diagrams showing forms of disposition of constituent members of the liquid crystal light valve 15.

FIG. 6A shows an arrangement in which the first phase difference plate 15*a* and the second phase difference plate 15*e* are sequentially disposed on a light incident side of the liquid crystal panel 15*c* from a first polarizing plate 15*b* side. FIG. 6B shows an arrangement in which the first phase difference plate 15*a* is disposed on the light incident side of the liquid crystal panel 15*c* and the second phase difference plate 15*e* is disposed on the light incident side of the liquid crystal panel 15*c*. FIG. 6C shows an arrangement in which the second phase difference plate 15*e* is disposed on the light incident side of the liquid crystal panel 15*c* and the first phase difference plate 15*a* is disposed on the light incident side of the liquid crystal panel 15*c*. FIG. 6D shows an arrangement in which the first phase difference plate 15*a* and the second phase difference plate 15*e* are sequentially disposed on the light emitting side of the liquid crystal panel 15*c* from a liquid crystal panel 15*c* side, which is employed in certain embodiments. FIG. 6E shows an arrangement in which the second phase difference plate 15*e* and the first phase difference plate 15*a* are sequentially disposed on the light incident side of the liquid crystal panel 15*c* from a first polarizing plate 15*b* side. FIG. 6F shows an arrangement in which the second phase difference plate 15*e* and the first phase difference plate 15*a* are sequentially disposed on the light emitting side of the liquid crystal panel 15*c* from the liquid crystal panel 15*c* side.

A projector according to exemplary embodiments may employ any one of the six types of arrangements shown in FIGS. 6A to 6F.

When the arrangement shown in FIG. 6B is employed, since the first phase difference plate 15*a* is disposed to be tilted on the light incident side of the liquid crystal panel 15*c*, bending of a light path on the light emitting side of the liquid crystal light valve can be prevented. In addition, since the second phase difference plate 15*e* is disposed on the light emitting side of the liquid crystal panel 15*c*, total light passing through the first phase difference plate 15*a* and light passing through the liquid crystal panel 15*c* can be compensated, and thereby a further improved optical compensation effect can be acquired.

When the arrangements shown in FIG. 6B and FIG. 6C in which phase difference plates are disposed on both sides of the liquid crystal panel 15*c* are employed, it is easy to acquire sufficient space for performing control operations for the tilt angle α of the first phase difference plate 15*a* and the rotation angle θ of the second phase difference plate 15*e* and there is sufficient space for disposition of a control mechanism.

When the first and second phase difference plates 15*a* and 15*e* are disposed on the light emitting side of the liquid crystal panel 15*c*, as shown in FIG. 6D, the phase difference plates can be located far from the light source, and thus deterioration of the phase difference plates 15*a* and 15*e* due to light emission and a resultant increase in the temperature thereof can be effectively prevented, and thereby a projector having high reliability can be provided.

Although a case where the optical axis P' of the first phase difference plate 15*a* is in a direction of a normal line of a plate face of the first phase difference plate 15*a* has been described in this embodiment, a phase difference plate having an optical axis aligned in a direction tilted with respect to a direction of the normal line of the plate face may be used as the first phase difference plate 15*a*. As such a phase difference plate, for example, a phase difference plate having an optically anisotropic layer including discotic liquid crystal that is oriented to be tilted (tilt-oriented) with respect to the plate face of the phase difference plate may be used. This phase difference plate may be formed by providing an orientation film on a support body made of triacetyl cellulose (TAC) or the like and coating a discotic liquid crystal such as a triphenylene derivative on the orientation film. In particular, orientation films made of polyimide or the like are formed on surfaces of a pair of support bodies are provided, a discotic liquid crystal is coated on one support body, and then the discotic liquid crystal is interposed therebetween by the other support body. Thereafter, a discotic nematic (ND) phase is formed by a heating process, and then fixing the orientation thereof by polymerizing the discotic nematic phase by using ultraviolet rays or the like. When the ND phase is formed, a pre-tilt is given to the discotic liquid crystal by the orientation film, and thereby an optical axis is formed to be tilted. A tilt angle of the optical axis can be controlled by an orientation process (a rubbing process or the like) of the orientation film.

Alternatively, the phase difference plate having the tilt optical axis may be produced by stretching poly carbonate, a norbornene resin, or the like by application of a sharing force. In such a case, a material resin is heated to an approximate glass transition point, then is stretched in two directions, and the stretched material resin is interposed between a pair of heated substrates. Then, the pair of the substrates is made to cross each other in opposite directions while pressure is applied to the material resin from an outer side of one substrate. Accordingly, a shearing force is applied to upper and lower sides of the material resin in opposite directions, and a direction of the optical axis of the optical body constituting the material resin is tilted. A tilt angle of the optical axis can be controlled by strength of the shearing force.

When the first phase difference plate 15*a* whose optical axis is tilted with respect to the normal line of the plate face is used, if the optical axis is identical to the pre-tilt direction of the liquid crystal panel 15*c*, the first phase difference plate 15*a* is not required to be tilted with respect to the liquid crystal panel 15*c*. However, there may be a case where disposition of the optical axes may be far apart from an optimal position due to production deviations or the like of the liquid crystal panel 15*c* and the phase difference plate 15*a*. Thus, when the first phase difference plate 15*a* is configured to be tilted as in this embodiment, the first phase difference plate 15*a* and the liquid crystal panel 15*c* can be controlled to a position in which an optical compensation process can be performed well.

Next, certain embodiments will be described with reference to FIG. 7. FIG. 7 is a diagram showing appropriate arrangement for a case where a first phase difference plate 15a and a second phase difference plate 15e according to this embodiment are built in a liquid crystal projector. In FIG. 7, a front side (a side on which a first polarizing plate 15b is disposed) of a liquid crystal light valve 15 is a light incident side.

As shown in FIG. 7, the projector according to this embodiment has a structure in which the first polarizing plate 15b, the second phase difference plate 15e, a liquid crystal panel 15c, the first phase difference plate 15a, and a second polarizing plate 15d are sequentially disposed from the light incident side. In other words, the arrangement shown in FIG. 6C is employed in the liquid crystal valve 15 according to this embodiment.

The projector according to this embodiment has a first optical control unit 81 that tilts the first phase difference plate 15a together with a support base 315a supporting the first phase difference plate 15a with respect to the liquid crystal panel 15c. The support base 315 is rotated around a rotation axis 81a by the first optical control unit 81, and thereby the first phase difference plate 15a can be tilted. The rotation axis 81a is set in a direction perpendicular to an orientation direction 43a (98a) of the liquid crystal panel 15c on a plate face of the first phase difference plate 15a. In this embodiment, since the orientation direction 43a is set to form an angle of 45° with respect to a horizontal direction, the support base 315a is disposed such that the rotation axis 81a thereof forms an angle of 135° with respect to the horizontal direction.

The disposition of the support base 315a is changed in accordance with the orientation direction 43a or 98a (that is, a viewing direction of the liquid crystal panel 15c). For example, when the orientation direction 43a of the liquid crystal panel 15c forms an angle of 135° with respect to the horizontal direction, the angle of the rotation axis 81a with respect to the horizontal direction is set to 135°. Since the viewing direction of the liquid crystal panel in the liquid crystal light valve is typically set to a direction of 45° or 135° with respect to the horizontal direction, when the rotation axis 81a of the support base 315a is set to be controlled (or switched) in the range of 45° to 135° with respect to the horizontal direction, in consideration with a case where a liquid crystal panel 15c whose orientation direction (viewing direction) is different is disposed, it is possible to implement a structure capable of responding to change of the liquid crystal panel 15c without making the structure thereof too complicated.

The projector according to this embodiment has a second optical control unit 82 that supports a second phase difference plate 15e and rotates the second phase difference plate 15e around an axis aligned in a direction of a normal line of the liquid crystal panel 15c, although detail of the second optical control unit is not shown in the figure. The second phase difference plate 15e can be rotated around the rotation axis set as a center position of a plate face of the second phase difference plate 15e by the second optical control unit 82.

Since the liquid crystal light valve 15 has the first optical control unit 81 that moves the first phase difference plate 15a in a direction for being tilted with respect to the panel face of the liquid crystal panel 15c, a tilt of the optical axis P' of the first phase difference plate 15a can be freely controlled, and accordingly, it is possible to precisely perform an optical compensation process of the liquid crystal panel 15c in an easy manner. Accordingly, a decrease in the contrast level due to a pre-tilt of the liquid crystal molecules 51 or light passing through the liquid crystal layer 34 in the tilt direction can be prevented, and thereby display with a high contrast level can be acquired. In addition, since the liquid crystal light valve 15 has the first optical control unit 81, when a center axis of an optical system of the light valve, for example, a center axis of a lens or a light source is not in accordance with the center axis of the liquid crystal panel 15c, a compensation condition can be optimized by controlling an angle of the phase difference plate 15a without controlling the light source side, and thereby a decrease in the contrast level can be prevented. In addition, by using the structure in which the first optical control unit 81 is included, even when a phase difference plate having an optical axis tilted with respect to a normal line of the plate face, delicate control can be performed in an easy manner, and accordingly, it is possible to prevent a decrease in the contrast level due to deviations of an optical property of the phase difference plate.

In addition, since the liquid crystal light valve 15 according to this embodiment has the second optical control unit 82 that rotates the second phase difference plate 15e within the plate face, it is possible to dispose the second phase difference plate 15e in a position in which a phase difference of the phase difference plates 15b and 15d having high deviations in a production process thereof or a phase difference due to diffraction of the micro lenses 95 can be effectively compensated. Accordingly, even a phase difference that cannot be compensated by the first phase difference plate 15a is effectively compensated, and thus the contrast level can be improved and non-uniformity of luminance caused by the phase differences can prevented, and thereby high-quality display can be acquired.

In addition, in this embodiment, the first and second phase difference plates 15a and 15e are spaced apart from a surface of the liquid crystal panel 15c by a predetermined distance so as not to disturb an optical control process performed by the optical control units 81 and 82. In addition, since the first and second phase difference plates 15a and 15e are far from the liquid crystal panel 15c, heat stored between the liquid crystal panel 15c and the phase difference plates can be minimized, whereby deterioration of the liquid crystal panel and the phase difference plates can be suppressed.

Next, certain embodiments will be described with reference to FIGS. 8A, 8B, 9A, and 9B.

First, a structure of a first phase difference plate included in a projector according to this embodiment will be described with reference to FIGS. 8A and 8B.

Figure 8A:
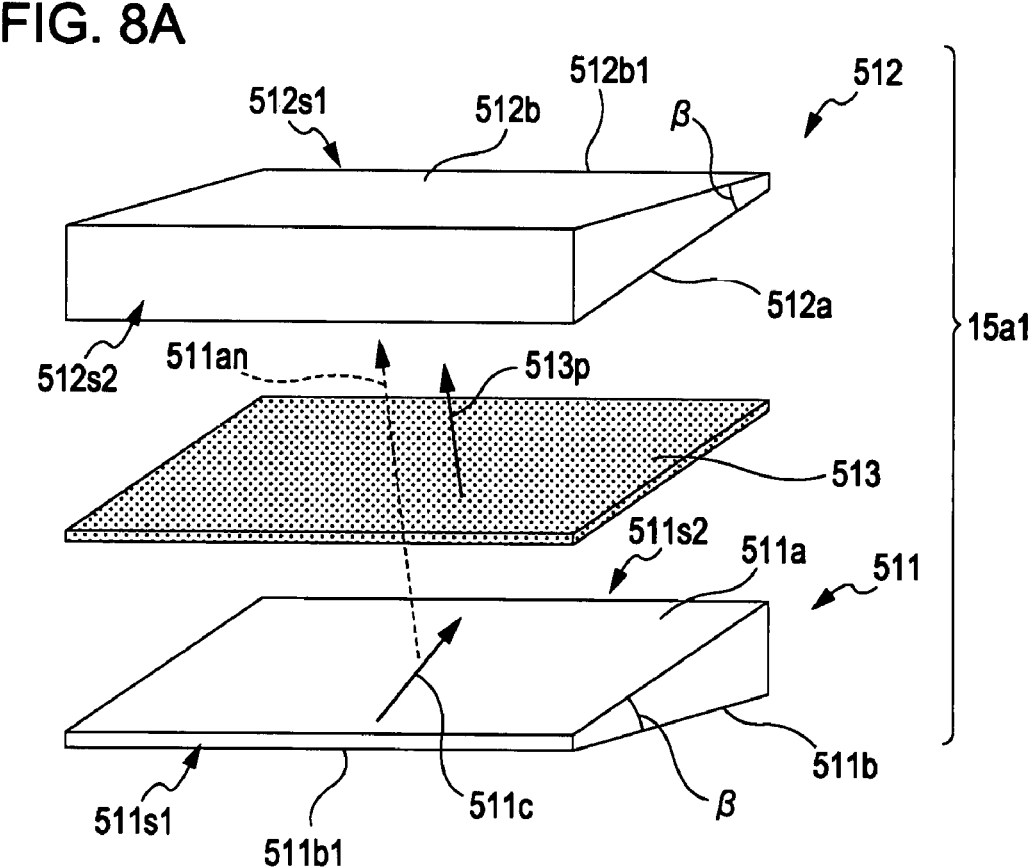
FIGS. 8A and 8B are perspective views illustrating a first phase difference plate according to an exemplary embodiment.
Figure 8B:
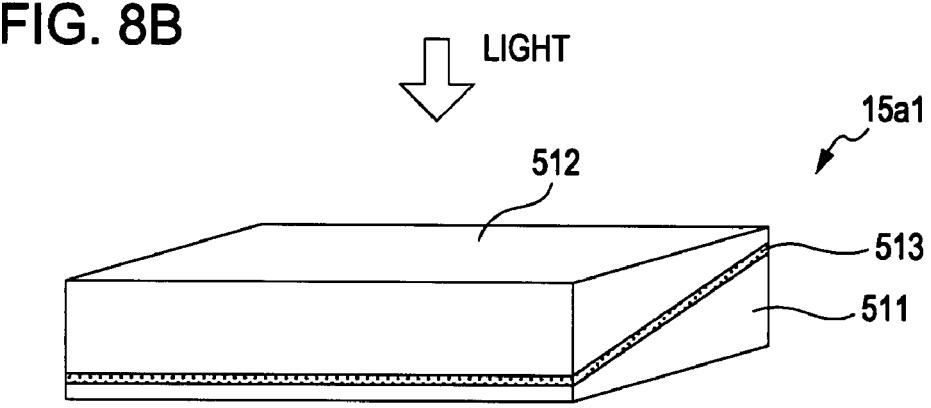

FIGS. 8A and 8B are perspective views illustrating a first phase difference plate according to certain embodiments. FIG. 8A is an exploded perspective view of a first phase difference plate according to certain embodiments. FIG. 8B is a perspective view of a first phase difference plate according to certain embodiments. In FIGS. 8A and 8B, an angle β is enlarged for the convenience of description.

The exemplary projector according to these embodiments is different from that according to the above described embodiments in that a first phase difference plate 15a1 is provided instead of the first phase difference plate 15a according to the above-described embodiments. However, the other parts of the exemplary projector are essentially the same as that according to the above-described embodiments.

As shown in FIGS. 8A and 8B, the first phase difference plate 15a1 according to certain embodiments has a first plate-shaped optical member 511, a second plate-shaped optical member 512, and an optically anisotropic layer 513.

As shown in FIG. 8A, the first plate-shaped optical member 511, for example, is made of plate-shaped glass. A surface 511a of the first plate-shaped optical member 511 is tilted by an angle of β with respect to a surface 511b, which faces the surface 511a, of the first plate-shaped optical member 511. The angle β is set in accordance with a pre-tilt of the liquid crystal and, for example, is set in the range of 6° to 10°. In other words, the first plate-shaped optical member 511 is formed in the shape of a wedge having a surface 511a formed to be tilted and a surface 511b formed without a tilt. Thus, a section cut vertically with respect to the surface 511b in an azimuth direction 511c forming an angle of 90° with a side 511b1 of the untilted surface 511b of the first plate-shaped optical member 511 is in the shape of a trapezoid. In other words, the surface 511a is tilted in the azimuth direction 511c forming an angle of 90° with the side 511b1 of the untilted surface 511b. Thus, a section cut vertically with respect to the surface 511b along the side 511b1 of the first plate-shaped optical member 511 is in the shape of a rectangle. In other words, a side 511s1 including the side 511b1 of the first plate-shaped optical member 511 forms a rectangle, and a side 511s2 facing the side 511s1 forms a rectangle.

The side 511b1 is an example of "one side of one surface" according to certain embodiments.

The second plate-shaped optical member 512, like the first plate-shaped optical member 511, is made of, for example, plate-shaped glass and is in substantially the same shape of that of the first plate-shaped optical member 511. For example, a surface 512a of the second plate-shaped optical member 512 is tilted by an angle of β with respect to a surface 512b of the second plate-shaped optical member 512 facing the surface 512a. The second plate-shaped optical member 512 may be formed in the shape of a wedge having the surface 512a formed to be tilted and the surface 512b formed without a tilt. Thus, a section cut vertically with respect to the surface 512b along a side 512b1 of the second plate-shaped optical member 512 may be in the shape of a rectangle. In other words, a side 512s1 of the second plate-shaped optical member 512 may form a rectangle, and a side 512s2 facing the side 512s1 may form a rectangle.

The first plate-shaped optical member 511 and the second plate-shaped optical member 512 are disposed such that the tilted surface 511a of the first plate-shaped optical member 511 and the tilted surface 512a of the second plate-shaped optical member 512 face each other and are in directions in which the decreasing thicknesses are opposite of each other.

The optically anisotropic layer 513 is formed of a negative uniaxial phase difference plate (that is, C plate) which is, for example, a film-like organic compound and is interposed between the first plate-shaped optical member 511 and the second plate-shaped optical member 512. Thus, an optical axis 513p of the optically anisotropic layer 513 is in accordance with a direction of a normal line of the surface 511a of the first plate-shaped optical member 511. The optically anisotropic layer 513 is bonded to the surface 511a of the first plate-shaped optical member 511 and the surface 512a of the second plate-shaped optical member 512, for example, with an adhesive.

By using the above-described first phase difference plate 15a1, since the optically anisotropic layer 513 of the first phase difference plate 15a1 is tilted with respect to the surface 511b or 512b forming the surface of the first phase difference plate 15a1, even when the angle α tilted by rotating the first phase difference plate 15a1 around the rotation axis 81a (see FIG. 7) using the first optical control unit 81 (see FIG. 7) is small, it is possible to make the optical axis 513p of the optically anisotropic layer 513 and the viewing direction of the liquid crystal panel 15c substantially similar to, or even approximately identical to, each other, with scarcely tilting or without tilting the first phase difference plate 15a1 by using the first optical control unit 81. Thus, a decrease in the contrast level due to a pre-tilt of the liquid crystal molecules 51 (see FIG. 3) or light passing through the liquid crystal layer 34 (see FIG. 3) in the tilt direction can be prevented, and accordingly, it is possible to acquire a display with higher-contrast.

In addition, since the angle α by which the first phase difference plate 15a1 is tilted with respect to the panel face of the liquid crystal panel 15c can be set to be small, radiation performance of the liquid crystal panel 15c can be improved. In other words, blocking of cooling air flow for cooling the liquid crystal panel 15c disposed inside a case of the projector 10 (see FIG. 1) due to disposition of the first phase difference plate 15a1 tilted with respect to the panel face of the liquid crystal panel 15c can be reduced or prevented.

In addition, it is possible to increase the pre-tilt angle that is an angle formed by the liquid crystal molecules 51 and a direction of a normal line of the panel face of the liquid crystal panel 15c. Accordingly, it is possible to improve a response time of the liquid crystal molecules 51 or decrease a reverse-tilt domain.

In this embodiment, as described above, since the optically anisotropic layer 513 is interposed between the first plate-shaped optical member 511 and the second plate-shaped optical member 512, it can be prevented that light emitted from the first phase difference plate 15a1 is tilted with respect to light incident on the first phase difference plate 15a1. In other words, since refraction of light caused by the first plate-shaped optical member 511 and refraction of light caused by the second plate-shaped optical member 512 can be offset, directionality of light in passing through the first phase difference plate 15a1 can be improved. In addition, since light incident on the first phase difference plate 15a1 is incident on the optically anisotropic layer 513 after passing through the second plate-shaped optical member 512, it is possible to suppress deterioration of the optically anisotropic layer 513. In other words, light resistance of the first phase difference plate 15a1 can be improved.

Next, a first phase difference plate according to a modified example of these embodiments will be described with reference to FIGS. 9A and 9B.

Figure 9A:
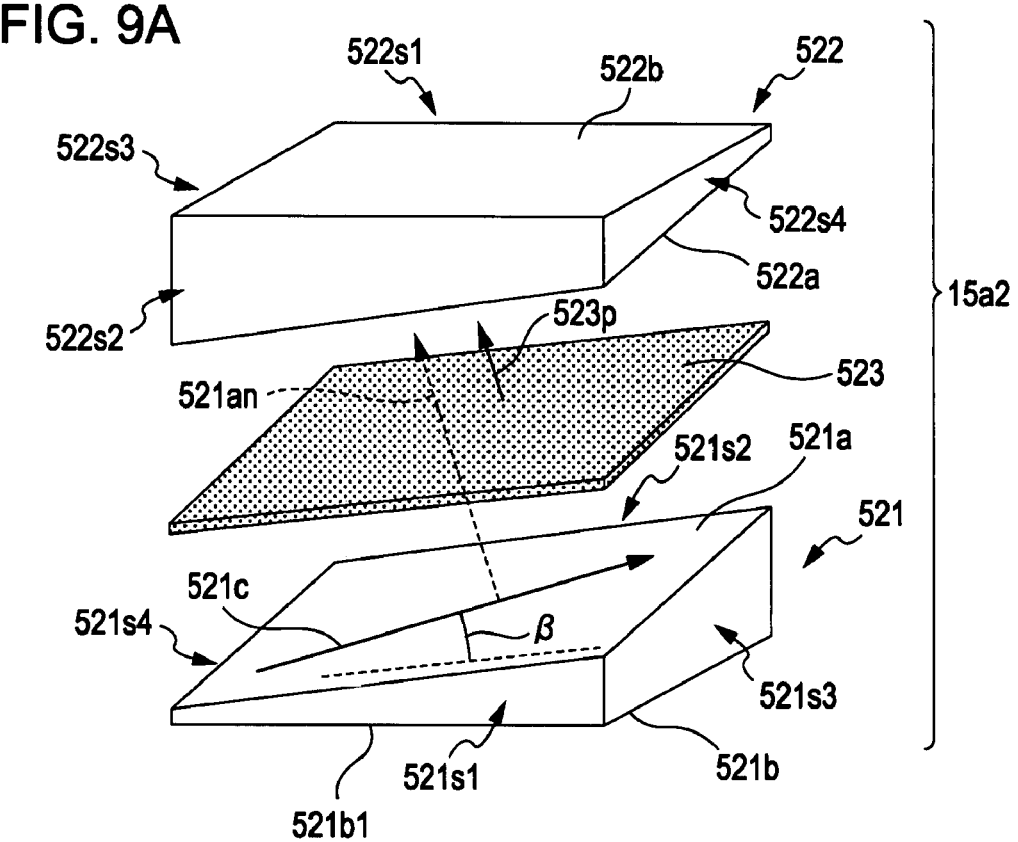
FIGS. 9A and 9B are perspective views illustrating a first phase difference plate according to an exemplary embodiment.
Figure 9B:
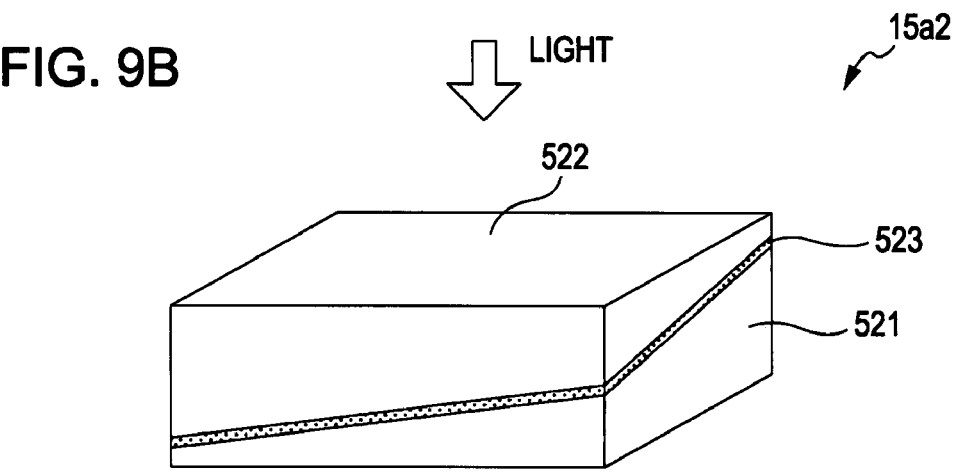

FIGS. 9A and 9B are perspective views of a first phase difference plate according to a modified example of certain embodiments. FIG. 9A is an exploded perspective view of a first phase difference plate according to the modified example of certain embodiments. FIG. 9B is a perspective view of a first phase difference plate according to the modified example of these embodiments.

The projector according to the embodiment may have a first phase difference plate 15a2 instead of the first phase difference plate 15a1 described above with reference to FIGS. 8A and 8B. In FIG. 9A, the angle β is enlarged for the convenience of description.

As shown in FIGS. 9A and 9B, the first phase difference plate 15a2 according to the modified example of the embodiment has a first plate-shaped optical member 521, a second plate-shaped optical member 522, and an optically anisotropic layer 523.

The first plate-shaped optical member 521, like the above-described first plate-shaped optical member 511, for example, is made of plate-shaped glass. A surface 521a of the first plate-shaped optical member 521 is tilted by an angle of β with respect to a surface 521b, which faces the surface 521a, of the first plate-shaped optical member 521. In other words, the first plate-shaped optical member 521 is formed in the shape of a wedge having a surface 521a formed to be tilted and a surface 521b formed without a tilt.

In this modified example, a section cut vertically with respect to a surface 521b in an azimuth direction 521c forming an angle of 45° with a side 521b1 of the untilted surface 521b of the first plate-shaped optical member 521 is in the shape of a trapezoid. In other words, the surface 521*a* is tilted in the azimuth direction 521*c* forming an angle of 45° with the side 521*b*1 of the untilted surface 521*b*. Thus, all sides 521*s*1, 521*s*2, 521*s*3, and 521*s*4 of the first plate-shaped optical member 521 are in the shape of trapezoids. In addition, the sides 521*s*1 and 521*s*2 face each other, and the sides 521*s*3 and 521*s*4 face each other.

The side 521*b*1 is an example of "one side of one surface" according to this modified example.

The second plate-shaped optical member 522, like the first plate-shaped optical member 521, is made of, for example, plate-shaped glass and is in the same shape of that of the first plate-shaped optical member 521. In other words, a surface 522*a* of the second plate-shaped optical member 522 is tilted by an angle of β with respect to a surface 522*b* of the second plate-shaped optical member 522 facing the surface 522*a*. A section cut vertically with respect to the surface 522*b* in an azimuth direction forming 45° with a side 522*b*1 of the untilted surface 522*b* of the second plate-shaped optical member 512 is in the shape of a trapezoid. Thus, all sides 522*s*1, 522*s*2, 522*s*3, and 522*s*4 of the second plate-shaped optical member 522 are in the shape of trapezoids. In addition, the sides 522*s*1 and 522*s*2 face each other, and the sides 522*s*3 and 522*s*4 face each other.

The first plate-shaped optical member 521 and the second plate-shaped optical member 522 are disposed such that the tilted surface 521*a* of the first plate-shaped optical member 521 and the tilted surface 522*a* of the second plate-shaped optical member 522 face each other and directions in which thickness thereof decreases become opposite.

The optically anisotropic layer 523, like the above-described optically anisotropic layer 513, is formed of a negative uniaxial phase difference plate and is interposed between the first plate-shaped optical member 521 and the second plate-shaped optical member 522. Thus, an optical axis 523*p* of the optically anisotropic layer 523 is in accordance with a direction 521*an* of a normal line of the surface 521*a* of the first plate-shaped optical member 521.

By using the above-described first phase difference plate 15*a*2, in a case where the orientation direction 43*a* of the liquid crystal panel 10*c* is set to form an angle of 45° with the horizontal direction, as shown in FIG. 7, by disposing the first phase difference plate 15*a*2 and the liquid crystal panel 15*c* such that a side of the first phase difference plate 15*a*2 and a side of the liquid crystal panel 15*c* are in accordance with each other, it is possible to make the optical axis 523*p* of the optically anisotropic layer 523 and the viewing direction of the liquid crystal panel 15*c* substantially similar or even approximately identical to each other. In other words, by using the first phase difference plate 15*a*2, it is not necessary to tilt the first phase difference plate 15*a*2 to form an angle of 45° with respect to the horizontal direction, unlike the above-described first phase difference plate 15*c* according to the embodiments described above with reference to FIG. 7.

Next, advantages of the above-described first phase difference plate according to this modified example will be described in more detail.

As described above with reference to FIG. 5, under a predetermined condition, when the tilt angle α (see FIG. 4 or 7) of the first phase difference plate 15*a* is set to 6°, the maximum contrast level can be acquired. However, when the pre-tilt angle of the liquid crystal molecules 51 is larger than the pre-tilt angle under the predetermined condition shown in FIG. 5, the tilt angle α of the first phase difference plate 15*a* should be set to be greater than 6° so as to acquire the maximum contrast level. In other words, when the pre-tilt angle of the liquid crystal molecules 51 is relatively large, in order to acquire the maximum contrast level, the tilt angle α of the first phase difference plate 15*a* is required to be increased on the basis of the pre-tilt angle. For example, when the pre-tilt angle of the liquid crystal molecules 51 is in the range of 6° to 9°, the maximum contrast level cannot be acquired unless the tilt angle α of the first phase difference plate 15*a* is set to 10°. Thus, when space for tilting the first phase difference plate 15*a* is not sufficiently acquired inside the projector, the tilt angle α of the first phase difference plate 15*a* cannot be set to 10°, and thereby there is a possibility that the maximum contrast level cannot be acquired.

However, in the first phase difference plate 15*a*1 according to this modified example, as described above, since the optically anisotropic layer 513 of the first phase difference plate 15*a*1 is tilted by an angle β with respect to the surface 511*b* (or surface 512*b*) of the first phase difference plate 15*a*1, even when the tilt angle α is small, the maximum contrast level can be acquired. In other words, for example, when the above described pre-tilt angle is in the range of 6° to 9°, the maximum contrast level can be acquired by setting the tilt angle to 4°. In other words, the tilt angle α for acquisition of the maximum contrast level can decreases by the angle β. In other words, in the first phase difference plate 15*a*1 according to this modified example, the contrast level can be increased when the tilt angle α is decreased, compared to the first phase difference plate 15*a* according to the above-described embodiments or setting the tilt angle α to zero. Accordingly, the space for tilting the first phase difference plate 15*a*1 inside the projector may be scarcely provided or may not be provided. Accordingly, it is possible to miniaturize the projector.

By using the first phase difference plate 15*a*2 according to this modified example, the same advantages as those of the above-described the first phase difference plate 15*a*1 can be acquired.

The preceding is merely a description of several embodiments. While specific embodiments and applications have been illustrated and described, it is to be understood that the precise configuration and components disclosed herein is illustrative only and not limiting in any sense. Having the benefit of this disclosure, various modifications, changes, and variations will be apparent to those of ordinary skill in the art without departing from the spirit and scope of the principles disclosed. Thus, to the maximum extent allowed by law, the scope of the invention is to be determined by the broadest permissible interpretation of the following claims and their equivalents, and shall not be restricted or limited by the foregoing description.

What is claimed is:

1. A projector comprising:
    a light source;
    a liquid crystal light valve for modulating light emitted from the light source, the liquid crystal light valve comprising:
        a liquid crystal panel pinching a liquid crystal layer between a pair of substrates,
        a pair of polarizing plates disposed with the liquid crystal panel therebetween,
        a first phase difference plate disposed between the pair of polarizing plates, the first phase difference plate including an optically anisotropic layer having a negative refractive index anisotropy and an optical axis oriented in a thickness direction of the first phase difference plate, and
        a second phase difference plate disposed between the pair of polarizing plates;

a first optical control unit for tilting the first phase difference plate with respect to a panel face of the liquid crystal panel; and a second optical control unit for rotating the second phase difference plate around an axis aligned in a direction of a normal line from the panel face of the liquid crystal panel, wherein the first phase difference plate further includes a first plate-shaped optical member having a first surface and a second surface that faces the first surface, the second surface being tilted with respect to the first surface;

the first surface and the second surface each have a substantially rectangular shape;

the second surface is tilted in a direction that forms an acute angle with a side of the first surface as viewed from a direction of a normal line from the first surface; and the optically anisotropic layer is formed on the second surface and the optical axis is aligned in a direction of a normal line from the second surface.

2. The projector according to claim 1, wherein the first optical control unit rotates the first phase difference plate around an axis that is perpendicular to a viewing direction of the liquid crystal panel on a plate face of the first phase difference plate.

3. A projector comprising:

a light source;

a liquid crystal light valve for modulating light emitted from the light source, the liquid crystal light valve comprising:

a liquid crystal panel pinching a liquid crystal layer between a pair of substrates, a pair of polarizing plates disposed with the liquid crystal panel therebetween, a first phase difference plate disposed between the pair of polarizing plates, the first phase difference plate including an optically anisotropic layer having a negative refractive index anisotropy and an optical axis oriented in a thickness direction of the first phase difference plate, and a second phase difference plate disposed between the pair of polarizing plates, the second phase difference plate including an optically anisotropic layer having either a positive or a negative refractive index anisotropy and an optical axis oriented in a face direction of the second phase difference plate;

a first optical control unit for tilting the first phase difference plate with respect to a panel face of the liquid crystal panel; and a second optical control unit for rotating the second phase difference plate around an axis aligned in a direction of a normal line from the panel face of the liquid crystal panel, wherein:

the first phase difference plate further includes a first plate-shaped optical member having a first surface and a second surface that faces the first surface, the second surface being tilted with respect to the first surface;

the first surface and the second surface each have a substantially rectangular shape;

the second surface is tilted in a direction that forms an acute angle with a side of the first surface as viewed from a direction of a normal line from the first surface; and the optically anisotropic layer is formed on the second surface and the optical axis is aligned in a direction of a normal line from the second surface.

4. The projector according to claim 3, wherein the optical axis of the first phase difference plate and a viewing direction of the liquid crystal panel are substantially similar to each other.

5. The projector according to claim 3, wherein the first phase difference plate further includes a second plate-shaped optical member disposed so as to interpose the optically anisotropic layer between the first plate-shaped optical member and the second plate-shaped optical member, and a first surface of the second plate-shaped optical member facing the optically anisotropic layer is formed so as to be tilted with respect to a second surface of the second plate-shaped optical member that is facing the first surface of the second plate-shaped optical member.

6. The projector according to claim 3, wherein the first optical control unit rotates the first phase difference plate around an axis that is perpendicular to a viewing direction of the liquid crystal panel on a plate face of the first phase difference plate.

* * * * *